(12) United States Patent
Willcox et al.

(10) Patent No.: US 11,645,287 B2
(45) Date of Patent: *May 9, 2023

(54) PLUGGABLE JOIN FRAMEWORK FOR STREAM PROCESSING

(71) Applicant: YAHOO ASSETS LLC, Dulles, VA (US)

(72) Inventors: David Willcox, Urbana, IL (US); Maulik Shah, Dublin, CA (US); Allie K. Watfa, Urbana, IL (US); George Aleksandrovich, Hoffman Estates, IL (US)

(73) Assignee: YAHOO ASSETS LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/826,419

(22) Filed: May 27, 2022

(65) Prior Publication Data
US 2022/0292102 A1    Sep. 15, 2022

Related U.S. Application Data

(63) Continuation of application No. 16/881,883, filed on May 22, 2020, now Pat. No. 11,347,748.

(51) Int. Cl.
| | | |
|---|---|---|
| G06F 16/17 | (2019.01) | |
| G06F 16/2455 | (2019.01) | |
| G06F 16/2457 | (2019.01) | |
| G06F 16/248 | (2019.01) | |
| G06F 9/4401 | (2018.01) | |

(52) U.S. Cl.
CPC ...... *G06F 16/24573* (2019.01); *G06F 9/4418* (2013.01); *G06F 16/1734* (2019.01); *G06F 16/248* (2019.01); *G06F 16/24552* (2019.01); *G06F 16/24568* (2019.01)

(58) Field of Classification Search
CPC ............ G06F 16/24573; G06F 9/4418; G06F 16/1734; G06F 16/24552; G06F 16/24568; G06F 16/248; G06F 16/215; G06F 16/254
See application file for complete search history.

(56) References Cited

U.S. PATENT DOCUMENTS

| | | |
|---|---|---|
| 9,069,681 B1 | 6/2015 | Qiu et al. |
| 10,592,115 B1 | 3/2020 | Izhar et al. |
| 2001/0052053 A1 | 12/2001 | Nemirovsky et al. |
| 2009/0172014 A1 | 7/2009 | Huetter |
| 2009/0287628 A1 | 11/2009 | Indeck et al. |
| 2009/0292877 A1 | 11/2009 | Piper et al. |
| 2011/0016123 A1 | 1/2011 | Pandey et al. |
| 2012/0130987 A1 | 5/2012 | Bose et al. |
| 2012/0303597 A1 | 11/2012 | Bird et al. |
| 2013/0339473 A1 | 12/2013 | Mccaffrey et al. |

(Continued)

*Primary Examiner* — Jorge A Casanova
(74) *Attorney, Agent, or Firm* — James J. DeCarlo; Greenberg Traurig, LLP

(57) ABSTRACT

Disclosed are embodiments for providing batch performance using a stream processor. In one embodiment, a method is disclosed comprising receiving an event, such as a streaming event, from a client. The method determines that the event comprises a primary event and, if so, writes the primary event to a cache and returning the primary event to the client. The method later receives a second event from the client, the second event associated with the first event, annotates the second event based on the primary event, and returns the annotated second event to the client.

20 Claims, 9 Drawing Sheets

(56) References Cited

U.S. PATENT DOCUMENTS

| | | |
|---|---|---|
| 2018/0322170 A1 | 11/2018 | Alberton et al. |
| 2019/0258733 A1 | 8/2019 | Brown |
| 2020/0177695 A1 | 6/2020 | Torson |
| 2020/0250172 A1 | 8/2020 | Busjaeger et al. |
| 2020/0334208 A1 | 10/2020 | Rupprecht et al. |
| 2021/0185142 A1 | 6/2021 | Paduroiu |
| 2021/0240712 A1 | 8/2021 | Oscherov et al. |
| 2022/0004396 A1 | 1/2022 | Ravid et al. |
| 2022/0012814 A1 | 1/2022 | Crabtree et al. |

PLUGGABLE JOIN FRAMEWORK FOR STREAM PROCESSING

CROSS-REFERENCE TO RELATED APPLICATIONS

This application is a continuation of and claims the benefit of U.S. Ser. No. 16/881,883, filed May 20, 2020 which is incorporated by reference in its entirety.

COPYRIGHT NOTICE

This application includes material that may be subject to copyright protection. The copyright owner has no objection to the facsimile reproduction by anyone of the patent disclosure, as it appears in the Patent and Trademark Office files or records, but otherwise reserves all copyright rights whatsoever.

BACKGROUND

In the era of big data processing, data pipelines have become vital to ingesting, processing, and outputting large quantities of data at high velocity and having high variability. In general, a data pipeline comprises a series of automated processing stages that take raw input data and convert the raw input data into a more suitable format for consumption by downstream computer processing systems.

Various architectures of data pipelines exist, including batch, Lambda, and Kappa architectures. Batch data pipelines process data in "batches" at regular intervals and are suitable for non-critical functionality while providing high reliability of data processing. Batch data pipelines, however, suffer from not being able to process data in real-time. Thus, a lag behind the ingestion of data and output of useful information or knowledge always exists in a batch data pipeline.

Lambda pipelines utilize a batch processor concurrently with a stream processor. In these pipelines, the batch processor processes all data within a historical batch while the stream processor "augments" the processed batch data with the results of stream processing. Eventually, the batch processor will "re-process" the data processed by the stream processor and overwrite the information generated by the stream processor. Lambda pipelines are fast, due to the use of stream processors; however, they require duplication of processing logic in both the stream processors and the batch processors. Further, Lambda pipelines use twice the processing hardware due to the use of two separate processing paradigms (i.e., stream and batch, which process the data in the same manner).

Like Lambda pipelines, Kappa pipelines utilize a stream processor. However, Kappa pipelines eschew a batch processor. Kappa pipelines require frequent "re-running" of event streams through the stream processor to provide simulated batch performance. Kappa pipelines ensure that streaming data is processed correctly (e.g., the pipeline does not drop or duplicate data); however, these pipelines ensure this by re-executing processing and are thus slower than pure streaming pipelines. Further, since Kappa pipelines use stream processing techniques, there is no method for performing more complex operations such as joins or aggregations, since these operations inherently require access to a full (e.g., batch) dataset. That is, stream processors inherently cannot perform these operations, thus replaying streams does not remedy this problem.

BRIEF SUMMARY

This disclosure recognizes a need in the art for a new pipeline architecture that provides the advantages of stream processors (e.g., speed) with the advantages of batch processors (e.g., integrity and complex operations). The disclosed embodiments provide these advantages and solve other problems in existing pipelines.

The disclosed embodiments describe an improved big data processing system that uses a stream processing engine with additional hardware and software to harden inaccuracies detected during stream processing.

In one embodiment, a method is disclosed comprising receiving a first event from a client, the first event comprising a streaming event; determining that the first event comprises a primary event; writing the first event to a cache and returning the first event to the client; receiving a second event from the client, the second event associated with the first event; annotating the second event based on the first event; and returning the annotated second event to the client.

In another embodiment, an apparatus is disclosed comprising a processor; and a storage medium for tangibly storing thereon program logic for execution by the processor, the stored program logic causing the processor to perform the operations of: receiving a first event from a client, the first event comprising a streaming event; determining that the first event comprises a primary event; writing the first event to a cache and returning the first event to the client; receiving a second event from the client, the second event associated with the first event; annotating the second event based on the first event; and returning the annotated second event to the client.

In another embodiment, a non-transitory computer-readable storage medium for tangibly storing computer program instructions capable of being executed by a computer processor is disclosed, the computer program instructions defining the steps of: receiving a first event from a client, the first event comprising a streaming event; determining that the first event comprises a primary event; writing the first event to a cache and returning the first event to the client; receiving a second event from the client, the second event associated with the first event; annotating the second event based on the first event; and returning the annotated second event to the client.

The illustrated embodiments provide numerous benefits over existing pipelines. The disclosed embodiments reduce data processing and certification times by certifying events using a stream processor versus a batch processor. Thus, the illustrated embodiments, do not require a "waiting" period prior to certifying results and can certify results in real-time or near real-time. The disclosed embodiments additionally utilize a single pipeline and thus do not require the hardware duplication, software complexity, and human resources required by Lambda pipelines. Relatedly, since application-level code must only be deployed once, rapid changes in data processing can be implemented without requiring separate development workflows. Additionally, since only one codebase is used, there is no risk of variations in processing between pipelines. Finally, in existing pipelines, sacrifices for speed can lead to a more significant variation between the initially posted results from the streaming pipeline and the final results from batch processing. As the latency of batch increases relative to streaming, this can lead to a lack of confidence in reporting as the variation becomes more pronounced. The disclosed embodiments alleviate this deficiency.

DETAILED DESCRIPTION

Figure 1A:
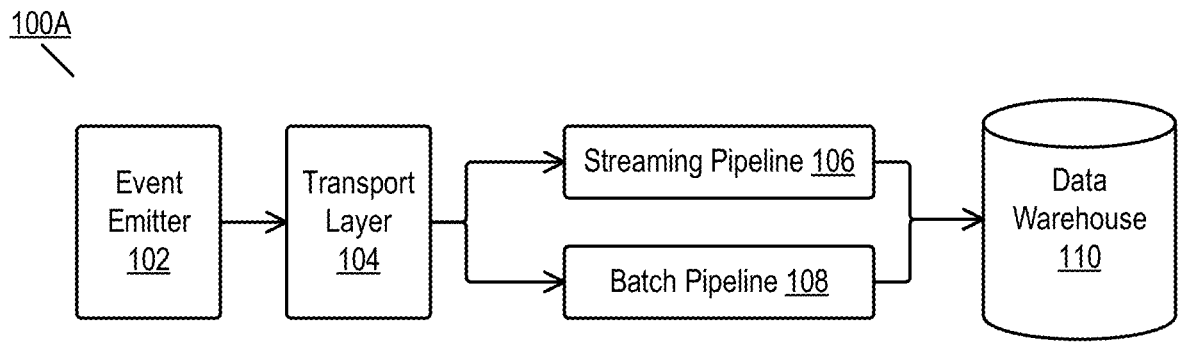
FIG. 1A is a block diagram illustrating a processing system employing a Lambda architecture.

FIG. 1A is a block diagram illustrating a processing system employing a Lambda architecture.

In the illustrated embodiment, events in the system (100a) originate from one or more event emitters (102). As used herein, an event refers to any type of data generated by a computing system. Generally, most events include arbitrary data as well as a timestamp indicating when the event emitter (102) generated the data. Alternatively, or in conjunction with the preceding, the system (100a) adds a timestamp representing the time the pipelines (106, 108) receive the event. In some embodiments, the timestamp comprises a standard time (e.g., based on a 24-hour clock). In some embodiments, the timestamp comprises a numerical value (e.g., time since UNIX epoch). In other embodiments, the timestamp may comprise a sequence number or other incrementing (or otherwise changing) value. In some embodiments, events further include nonce values to ensure uniqueness.

The event emitters (102) can comprise any computing system capable of generating data. The disclosure places no limitations on the type of data or type of systems capable of generating such data. As one example, an event emitter may include a digital analytics system configured to track and monitor user events on webpages or in mobile apps. A digital analytics platform generates many events as users access products. One example is the delivery of advertising creatives. In these scenarios, the analytics platform generates an event indicating that a server transmitted the creative to the end-user. The analytics platform also generates an event indicating that the end-user device displayed the creative (i.e., an impression). If the end-user interacts with the creative, the analytics platform generates a "click" event (which may be any type of interaction including touch events and thus is not limited to physical mouse clicks). In certain embodiments, the analytics platform also generates conversion events that indicate that after an impression, and after a click, the end-user has completed another action (e.g., completes a digital purchase) that is related to the previous events. In some embodiments, the analytics platform tracks all of these events via a client-side identifier stored in, for example, a cookie or other end-user storage mechanism.

In some embodiments, event emitters (102) are part of the system (100a). That is, in some embodiments, the system (100a) includes and has some level of control over the event emitters (102). Examples of this type of arrangement include internal data sources for an organization (e.g., internal analytics tracking). In other embodiments, the event emitters (102) comprise third-party systems. In some embodiments, the system (100a) receives events from both internal and external event emitters (102).

In either scenario, event emitters (102) transmit events over a transport layer (104). The transport layer (104) comprises one or more network protocols and one or more physical media used for transporting data. The disclosure does not unduly limit the structure of the transport layer. In some embodiments, the system (100a) uses an Internet protocol suite (e.g., transmission control protocol (TCP) and Internet protocol (IP)) as the transport layer (104). The system (100a) may use other models such as those adhering to the Open Systems Interconnection (OSI) model or other types of protocol models. In some embodiments, the transport layer (104) performs other operations on the events beyond network routing (e.g., TCP/IP). For example, the transport layer (104) may compress events using, as an example, gzip or other compression algorithms.

The specific internal workings of the transport layer (104) are not limiting, and the system (100a) may ignore various features of the transport layer (104) that are handled entirely in the transport layer (e.g., congestion control in a TCP layer). However, as discussed in more detail herein, the transport layer (104) may include inherent data transfer characteristics that impact the processing of the data by systems. One example, discussed in more detail in FIG. 2 et seq, is that some transport layer (104) designs may unintentionally (or, in some cases, intentionally) duplicate events transmitted over a network. In such networks, the event emitters (102) transmit one event, but the pipelines (106, 108) receive two or more events. A more concrete example of such a transport layer is a publish-subscribe system such as Apache® Kafka, which can provide "at least once" delivery of events.

As illustrated, the system (100a) routes events from the transport layer (104) to both a streaming pipeline (106) and a batch pipeline (108). In the illustrated embodiment, the batch pipeline (108) processes data in batches. As used herein, a batch refers to a period in which the batch pipeline (108) analyzes data (e.g., every hour). The disclosure does not describe the specific inner workings of the batch pipeline (108) in detail; however, the batch pipeline (108) comprises any processing system that provides accurate processing of data. Examples of batch pipelines include Hadoop clusters. The batch pipeline (108) ensures this accuracy by running slowly and at fixed intervals upon receiving all needed data. Since the batch pipeline (108) requires a fixed period of data (e.g., one hour) and a second fixed period to process the data (e.g., three hours), the batch pipelines (108) are consistently "behind" the current time. That is, when the batch pipeline (108) writes data to the data warehouse (110), the data written is "stale" by a fixed amount of time (e.g., four hours in the previous examples). However, as stated above, consumers of the batch-processed data can be confident that the data is accurate.

As a brief aside, before Lambda systems, big data systems often only included a batch pipeline (108) and did not include a streaming pipeline (106). As a result, such systems produced consistently delayed results. To remedy this delay, the system (100a) includes a streaming pipeline (106). Such a pipeline may comprise one or more stream processors such as Apache® Storm processors or similar stream processors. In contrast to the batch pipeline, the streaming pipeline (106) processes data in real-time or near real-time. Thus, when the streaming pipeline (106) receives an event over the transport layer (104), it immediately processes or transforms the event and writes the processed event to the data warehouse (110).

Since the streaming pipeline (106) processes events quickly and in isolation, the streaming pipeline (106) may introduce errors in the processed data. For example, the streaming pipeline (106) generally does not guard against writing duplicate data if the pipeline (106) receives duplicate events. Similarly, the streaming pipeline (106) may inadvertently drop some events. Thus, the streaming pipeline (106) is fast but inaccurate.

In the illustrated embodiment, the data warehouse (110) segments data received from the streaming pipeline (106) and the batch pipeline (108) into two separate storage areas. Additionally, as the batch pipeline (108) "catches up" to the data processed by the streaming pipeline (106), the data warehouse (110) overwrites the results of the streaming pipeline (108). Thus, at any given moment, the data warehouse (110) stores accurate, batch-processed data and a smaller, more recent subset of inaccurate stream-processed data. Absent system failures, the size subset of the inaccurate data remains constant while the size of the accurate data increases over time.

To support the above format of the data warehouse, the system (100a) must duplicate logic between the streaming pipeline (106) and the batch pipeline (108). Since the streaming results must be "reconciled" with the results of the batch processing, the streaming pipeline (106) and batch pipeline (108) must process the events in the same manner. This requirement doubles both the development time and the computing resources needed to support both pipelines (106, 108). Additionally, the system (100a) requires additional software and hardware to enable the data warehouse (110) to perform the reconciliation process after the completion of each batch processing job.

Figure 1B:
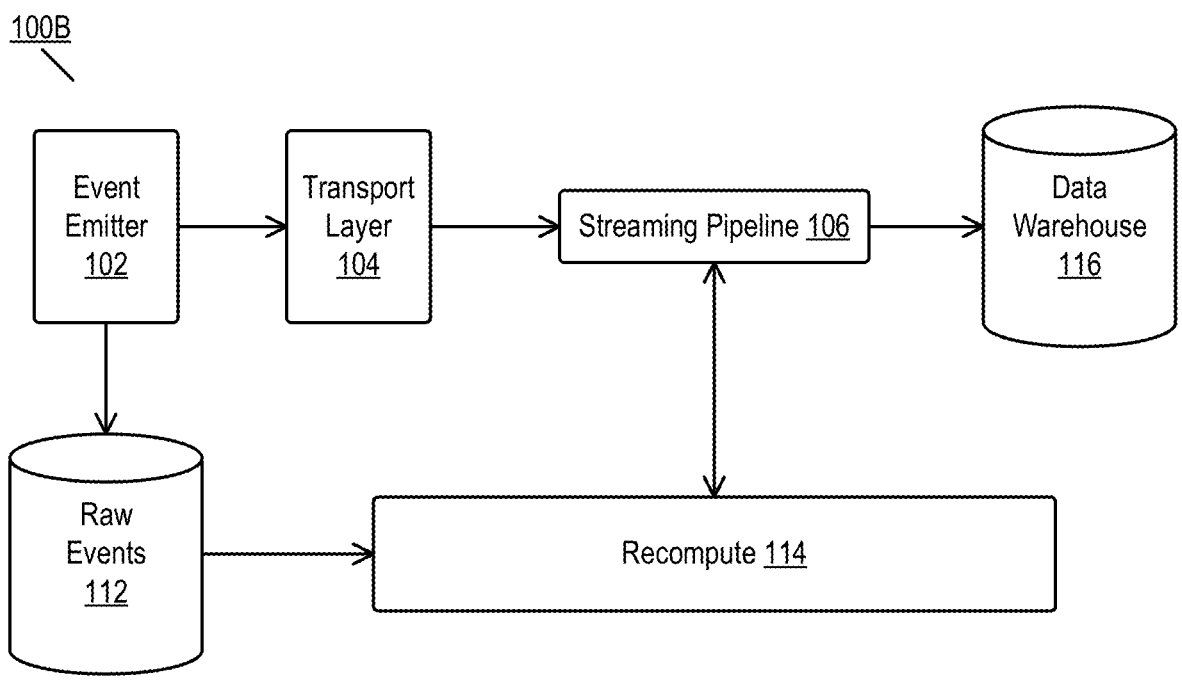
FIG. 1B is a block diagram illustrating a processing system employing a Kappa architecture.

FIG. 1B is a block diagram illustrating a processing system employing a Kappa architecture. The illustrated system (100b) solves some of the problems of Lambda architectures, as discussed in the preceding figure. However, the system (100b) introduces additional problems and fails to provide full batch support.

Various elements of the system (100b) are identical, or nearly identical, to those similarly numbered elements of FIG. 1A. The event emitters (102) and the data transport layer (104) perform the same functions as previously described. Also, the streaming pipeline (106) may perform many, if not all, of the same operations of the streaming pipeline (106) discussed in FIG. 1A.

As illustrated, the streaming pipeline (106) receives events generated by the event emitters (102) over the data transport layer (104). The streaming pipeline (106) processes this data and writes the processed data to the data warehouse (116). In contrast to the data warehouse (110) in FIG. 1A, the data warehouse (116) may only include a single storage area for data given the absence of a batch processing layer.

As described in the description of the previous system (100a), streaming pipelines (106) generally cannot guarantee the accuracy of data processing. Some systems (e.g., 100b) remedy this problem by employing "micro batching" whereby small batches of stream events are processed simultaneously. In general, these batches represent milliseconds of events, thus providing reasonable speed while simulating small batches. Micro-batching, however, fails to provide the level of accuracy provided by larger (e.g., one hour) batches. Another technique uses recompute logic (114) to re-process streaming events when the logic of the streaming pipeline (106) changes or based on other requirements. In this scenario, the system (100b) can store raw events in the raw events storage module (112), the recompute logic (114) retrieves these events. The recompute logic (114) then streams the events into the stream pipeline (106) for re-processing. In one scenario, the recompute logic (114) executes when the system (100b) changes the processing logic of the streaming pipeline. Thus, if the system (100b) modifies how the streaming pipeline (106) processes events, the recompute logic (114) simulates a historical event stream. In another embodiment, the recompute logic (114) can stream data from the raw events storage module (112) to the streaming pipeline (106) at fixed intervals, thus simulating a batch processing mode. However, there are numerous challenges to this approach that limit its effectiveness. First, data from the raw events storage module (112) must be re-streamed in the same order as streamed initially, to ensure the integrity of the re-processing. Thus, the recompute logic (114) reproduces inaccuracies relating to out-of-order events during the re-streaming. Second, the infrastructure that supports the streaming pipeline (106) generally cannot handle significant increases in streaming data, thus limiting the total amount of re-streamed data the streaming pipeline (106) can handle at any given time. Third, and most importantly, the streaming pipeline (106) cannot inherently perform various operations that a batch pipeline (108) can perform, such as joins or aggregations. Thus, even if re-streamed, the output of the streaming pipeline (106) always lacks these advanced operations.

Figure 2:
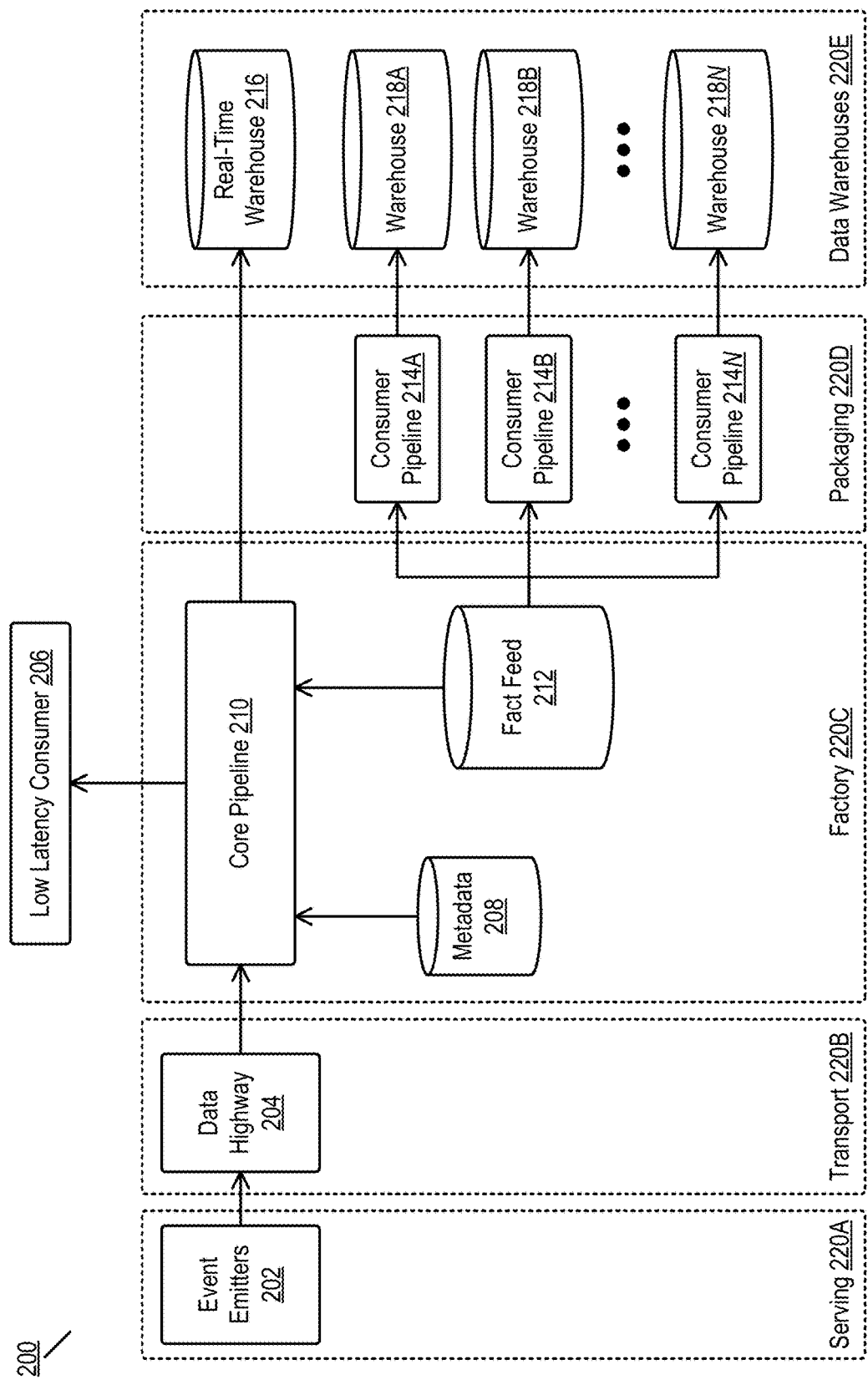
FIG. 2 is a block diagram illustrating a data processing system according to some embodiments of the disclosure.

FIG. 2 is a block diagram illustrating a data processing system according to some embodiments of the disclosure.

The illustrated system (200) segments the data processing into multiple logical layers. In some embodiments, these layers may also comprise physical layers, with each layer physically connected via a network interconnect. The illustrated layers comprise serving (220a), data transport (220b), pipeline factory (220c), packaging (220d), and warehousing (220e) layers.

The serving layer (220a) includes one or more event emitters (202). In the illustrated embodiment, these event emitters (202) can be similar or identical to the event emitters (102) discussed previously. As a few examples, the event emitters (202) can comprise systems including, but not limited to, ad servers, web servers, and beacon servers, that produce raw traffic events and send the events factory layer (220c) via the data transport layer (220b). In the illustrated embodiment, the data transport layer (220b) represents the previously described data transport (204). In the illustrated embodiment, the data transport layer (220b) comprises multiple network topologies and protocols that, when combined, deliver events to the factory layer (220c).

Figure 3:
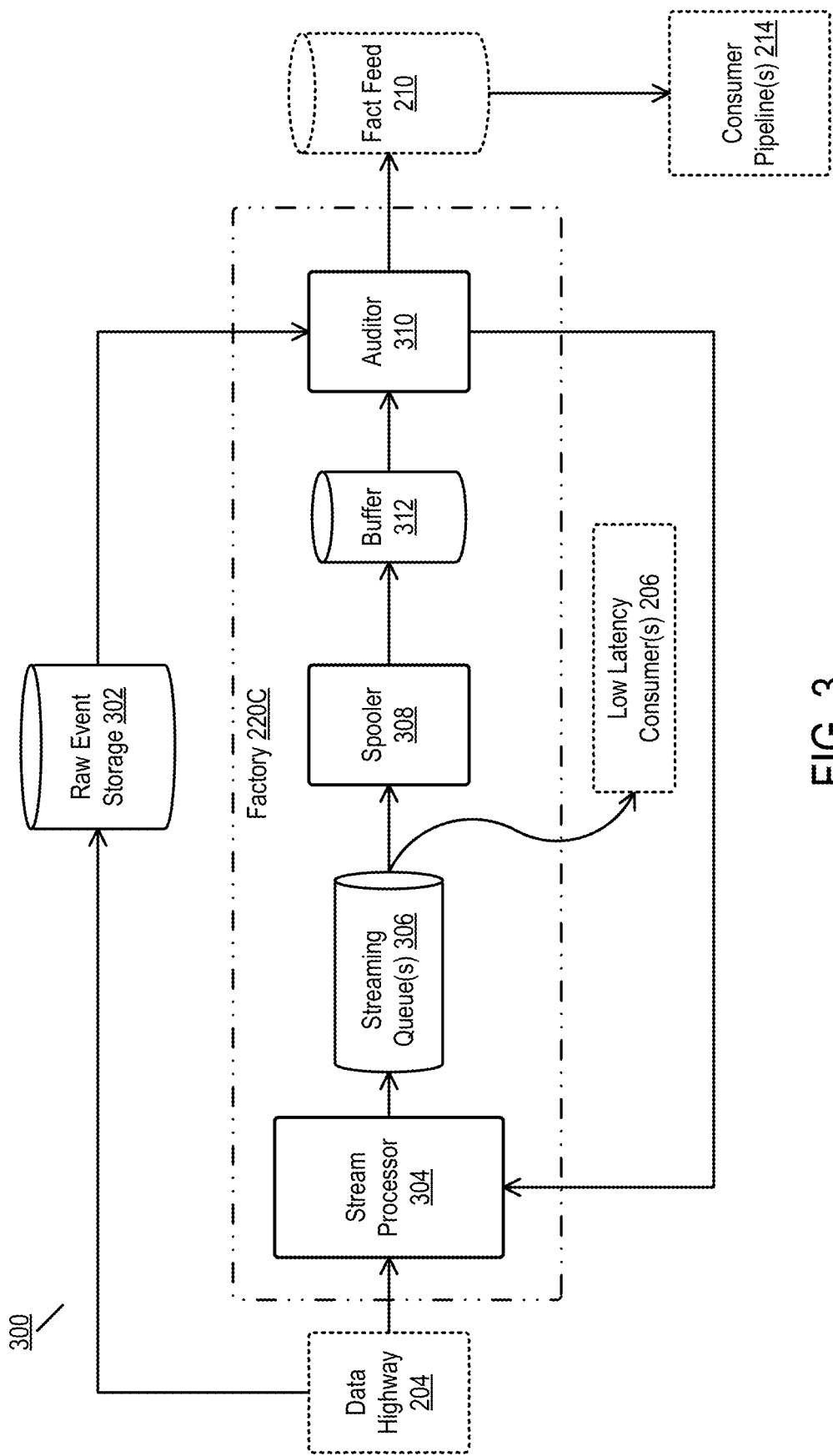
FIG. 3 is a block diagram illustrating a pipeline factory according to some embodiments of the disclosure.
Figure 4:
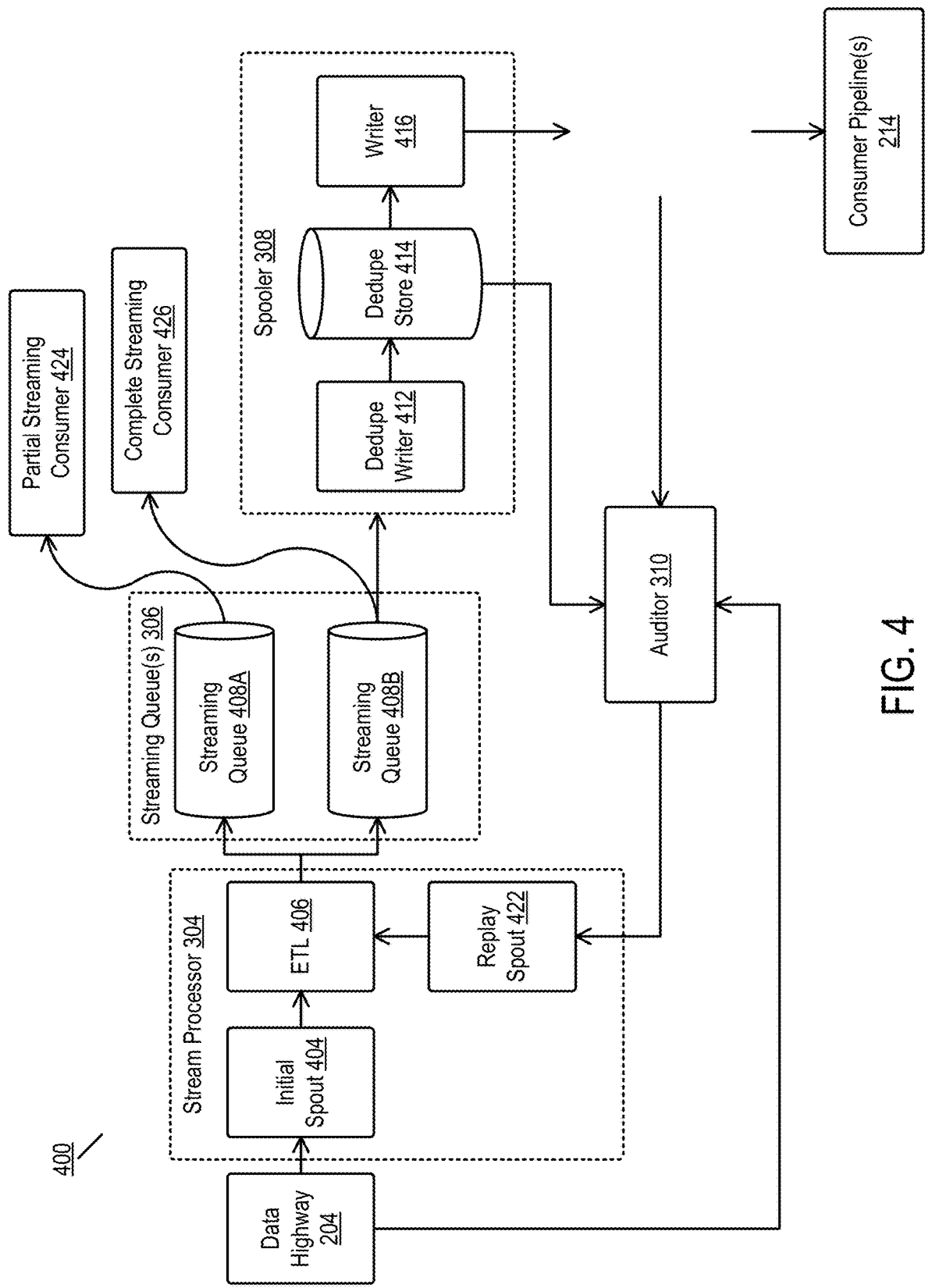
FIG. 4 is a block diagram illustrating a core pipeline according to some embodiments of the disclosure.

In the illustrated embodiment, the factory layer (220c) receives raw events from the data transport layer (220b) and processes the events via a core pipeline (210). The description of FIG. 3 provides further detail regarding the factory layer (220c), and the description of FIG. 4 provides further detail regarding the core pipeline (210). Thus, the following description of the factory layer (220c) only briefly describes the layer (220c) and the core pipeline (210), and FIGS. 3 and 4 present further detail.

The factory layer (220c) is responsible for doing the bulk of the processing of event traffic via the core pipeline (210).

The following description describes exemplary processing operations performed by the core pipeline (210). The core pipeline (210) may perform some or all of the following operations as well as additional operations.

In one embodiment, in the serving (220a) and data transport (220b) layers, devices often compress and bundle data to conserve bandwidth. As a result, the core pipeline (210) may perform a parsing operation that unpacks or processes complex data structures (e.g., blobs) so that downstream consumer systems can access the data. Thus, as one example, the core pipeline (210) can detect that an incoming event was compressed using a gzip algorithm and may first unzip the event.

In another embodiment, the core pipeline (210) performs explosion operations. An explosion operation comprises unpacking composite events. For example, a multi-serve event comprises an event indicating that an end-user device received a set of content to be displayed. Thus, the multi-serve event comprises a data structure describing multiple items of content (e.g., advertisements). The core pipeline (210) may transform a single multi-serve event into multiple single-serve events such that each item of content in the event is associated with an independent event for later processing.

In another embodiment, the core pipeline (210) performs metadata annotation operations. As illustrated, the core pipeline (210) communicates with a metadata store (208). In one embodiment, the metadata store (208) comprises a data storage device such as a MySQL database or other type of relational database. In other embodiments, the metadata store (208) may comprise other types of data storage devices (e.g., a key-value data store). The core pipeline (210) accesses the metadata store (208) to perform dimensional annotation on incoming event data. As used herein, dimensional annotation refers to the augmenting of data with additional other data. For example, a content serving event may only a line item identifier identifying the served content. The core pipeline (210) may access the metadata store (208) and look up a parent insertion order, an advertiser identifier, and an organization for that line item identifier. The core pipeline (210) may then augment the line item identifier with this metadata to generate an annotated event. In this way, downstream consumer systems can group and aggregate based on the line item identifier.

In another embodiment, the core pipeline (210) performs traffic annotations. A traffic annotation comprises a complex join of an event with a prior event. For example, a click event may need to be joined with a first impression event to annotate the click with auction information or targeting information that is only available in the first impression.

In another embodiment, the core pipeline (210) performs arbitrary computations dictated by business logic. An example of this type of computation is a currency conversion. By doing the operation only once in the core pipeline (210), the system (200) can ensure consistency across all subsequent consumer systems, rather than requiring downstream consumer systems to implement the same rules and possibly arrive at different results.

In another embodiment, the core pipeline (210) validates incoming events. In this embodiment, the core pipeline (210) can filter events based on traffic conditions.

In another embodiment, the core pipeline (210) performs deduplication on incoming events. As discussed previously, the data transport layer (220b) may support "at least once" semantics. Alternatively, or in conjunction with the preceding, event emitters may allow duplicate events. Regardless of the source of duplication, the core pipeline (210) ensures that all events are processed and stored once and not duplicated. For example, the core pipeline (210) may allow more than one click event per impression event during a given period.

In another embodiment, the core pipeline (210) performs normalization on the received events. During a normalization operation, the core pipeline (210) "fits" an event to a particular schema or layout to facilitate reporting. This schema or layout is typically a standard field alignment and transformation.

Finally, in some embodiments, the core pipeline (210) performs a fast feedback operation. In this operation, the core pipeline (210) provides feeds or streams of data at very low latency to low-latency consumers (206) such as an ad serving budget control system. Typically, most consumer systems wait until the core pipeline (210) has completed all processing steps; however, some consumer systems are willing to sacrifice quality for timing. These specialty stages can be critical to some consumer systems.

In general, the core pipeline (210) processes events linearly: the quality of the event data increases as data passes from one processing operation to the next. Ultimately, after the core pipeline (210) applies all operations to the event data, the core pipeline (210) writes the processed event to one or more fact feeds (212). In the illustrated embodiment, a fact feed (212) comprises a log of every event that was received by the core pipeline (210) and any additional information that the core pipeline (210) annotates or computes. The fact feeds (210) become the source of truth for the entire system (200). By having the core pipeline (210) compute the fact feed (212) used by subsequent consumers pipelines (214a, 214b, 214n), the overall quality of the system (200) is improved.

Since the system uses a centralized fact feed (212), the core pipeline (210) never removes any field from an event. Additionally, the core pipeline (210) does not modify any raw field that it receives from the core pipeline (210) from the data highway (204). However, as one exception, the core pipeline (210) may replace null or empty fields with a static or default value, as this may assist downstream consumer systems (214a, 214b, 214n). In most embodiments, the core pipeline (210) does not attempt to "correct" or "fix" invalid values in an event. However, the core pipeline (210) may deviate from this requirement to recover from failed launches or bugs. In some embodiments, if the core pipeline (210) violates this requirement and fixes an invalid value in an event, the core pipeline (210) annotates the record with a flag so that a downstream consumer system can monitor the rule.

Importantly, the core pipeline (210) also ensures that no event is duplicated in the final fact feed (212). Thus, the core pipeline (210) never intentionally duplicates or allows duplicate events to result from the operations.

In the illustrated embodiment, the packaging layer (220d) comprises various consumer pipelines (214a, 214b, . . . 214n) retrieve or receive data from the fact feed (212). The packaging layer (220d) accesses the fact feed (212) and provides the processed events therein to downstream consumer pipelines (214a, 214b, . . . 214n). Whereas the factory layer (220c) is typically a complex, but linear processing stage, the packaging layer (220d) is typically composed of multiple parallel consumer pipelines (214a, 214b, . . . 214n). Consumer pipelines (214a, 214b, . . . 214n) are typically minimal, possibly single-stage pipelines that project and aggregate the events in the fact feed (212) for loading into a warehouse (e.g., 218a, 218b, . . . 218n) or similar system. The availability of the fact feed (212) triggers consumer pipelines (214a, 214b, . . . 214n), and thus the consumer pipelines (214a, 214b, . . . 214n) may run in parallel with one another.

In some instances, the consumer pipelines (214a, 214b, . . . 214n) are external to the factory layer (220c) and warehouse layer (220e). In other instances, the system (200) includes and controls the consumer pipelines (214a, 214b, . . . 214n). Alternatively, or in conjunction with the preceding, the warehousing layer (220e) may be external to the system (200). In various embodiments, the consumer pipelines (214a, 214b, . . . 214n) generally perform some or all of the following operations (or combinations thereof).

In one embodiment, the consumer pipelines (214a, 214b, . . . 214n) perform mapping and transformation operations. In these operations, the consumer pipelines (214a, 214b, . . . 214n) may require the data in a format different than the format of the fact feed (212). For example, the consumer pipelines (214a, 214b, . . . 214n) may map enumerated values (possibly in a lossy fashion) to fit a further downstream consumer data model.

In another embodiment, the consumer pipelines (214a, 214b, . . . 214n) perform projection operations. In some embodiments, consumer pipelines (214a, 214b, . . . 214n) will typically not require every field of the fact feed (212). Thus, the consumer pipelines (214a, 214b, . . . 214n) only ingest a small fraction of the available columns.

In another embodiment, the consumer pipelines (214a, 214b, . . . 214n) perform aggregation operations. In some embodiments, the consumer pipelines (214a, 214b, . . . 214n) aggregate facts and produce metric fields for efficient loading into a database or similar data store.

In another embodiment, the consumer pipelines (214a, 214b, . . . 214n) perform reverse annotation joins (e.g., right outer joins). In some embodiments, the consumer pipelines (214a, 214b, . . . 214n) perform join operations that cannot be implemented efficiently within the core pipeline (210). For example, a data science consumer pipeline may require a feed containing every impression event joined to any future click events recorded in the fact feed (212). Because this type of pipeline requires data collected over a long period before processing can begin, it would negatively impact all consumer pipelines (214a, 214b, . . . 214n) to wait. Therefore, the pipeline performs these joins in batch outside of the core pipeline (210).

In another embodiment, the consumer pipelines (214a, 214b, . . . 214n) perform rollup operations. In some embodiments, the consumer pipelines (214a, 214b, . . . 214n) may choose to create rollup feeds of the raw facts stored in fact feed (212). For example, the consumer pipelines (214a, 214b, . . . 214n) may create an hourly feed from a five-minute fact feed. The consumer pipelines (214a, 214b, . . . 214n) may perform this operation to use fewer filenames in a distribute filed system (e.g., the Hadoop Filesystem, HDFS) since such a file system collapses multiple files into larger single files. Further, the rollup may typically transform the data into a columnar format like Optimized Row Columnar (ORC) to promote faster ad hoc projection.

In another embodiment, the consumer pipelines (214a, 214b, . . . 214n) perform sketch operations. In some embodiments, as the consumer pipelines (214a, 214b, . . . 214n) generate aggregates, the consumer pipelines (214a, 214b, . . . 214n) may produce aggregate sketch columns to capture unique users or similar complex computations. The consumer pipelines (214a, 214b, . . . 214n) can perform this expensive operation once on behalf of multiple end-users or downstream systems.

In another embodiment, the consumer pipelines (214a, 214b, . . . 214n) perform cleansing operations. In some embodiments, the consumer pipelines (214a, 214b, . . . 214n) may cleanse data in the fact feed (212) for a specific purpose. For example, cookies or personally identifiable information (PII) might need to be anonymized, or the consumer pipelines (214a, 214b, . . . 214n) may need to obscure data to enforce data visibility controls.

In some embodiments, the consumer pipelines (214a, 214b, . . . 214n) can be hierarchal. That is, a first consumer pipeline may perform one or more shared steps, and downstream consumer pipelines use the output of the first consumer pipeline as input.

After processing by consumer pipelines (214a, 214b, . . . 214n), each of the consumer pipelines (214a, 214b, . . . 214n) output further processed event data to respective data warehouses (218a, 218b, . . . 218n) in the warehousing layer (220e). The warehousing layer (220e) is generally the final stage of the system (200), where data is loaded into various systems to facilitate reporting, billing, or analysis. A data team may be responsible for various aspects of the warehousing, or it may be delegated to a data customer instead. Operations for a data team include loading, replication, and verification. In loading operations, the system (200) may need to load the data into a data warehouse (e.g., an Oracle or Druid data warehouse) or place the data onto a shared drop box or similar system. In replication operations, the system (200) may need to replicate a data feed to another data processing (e.g., Hadoop) cluster in a different co-location. In a verification operation, the system (200) may need to verify that the data loaded into a warehouse (218a, 218b, . . . 218n) accurately matches the original fact feed (210) (i.e. certify there was no data loss).

As illustrated, in some embodiments, data bypasses the packaging layer (220d). In these embodiments, the core pipeline (210) streams output directly to a real-time data warehouse (216). In the illustrated embodiment, the real-time data warehouse (216). In the illustrated embodiment, the system (200) may use a real-time data warehouse (216) for reporting or similar functions that do not require high data accuracy.

FIG. 3 is a block diagram illustrating a pipeline factory according to some embodiments of the disclosure.

In the illustrated embodiment, a data highway (204) delivers events from one or more event emitters (not illustrated) to a factory layer (220c) and raw event storage (302). The description of FIG. 2 provides further detail regarding the data highway (204) which is not repeated herein.

In the illustrated embodiment, the raw event storage (302) may comprise a distributed file system (e.g., HDFS). In one embodiment, the system (300) writes raw events to the raw event storage (302) as they are received. In some embodiments, the system (300) writes the raw events to raw event storage (302) in a batch mode. That is, the system (300) writes a separate file for each batch period (e.g., one hour), the file including all events received during that period. In some embodiments, not illustrated, external consumer systems can access the raw event storage (302) to perform batch processing. Thus, in some embodiments, the raw event storage (302) can be used to provide backwards compatibility with existing batch pipelines.

As illustrated, a stream processor (304) receives events from the data highway (204). In one embodiment, the stream processor (304) comprises a distributed stream processor. In one embodiment, the stream processor (304) comprises a streaming topology that defines data processing stages to perform on events.

One example of a stream processor (304) is an Apache® Storm topology. Briefly, a Storm topology is a graph of inputs and processing nodes. The topology receives events as input streams. Each event in the input stream comprises a tuple and the input stream itself is an unbounded series of such tuples. The topology receives streams from input sources, referred to as "spouts." The topology performs all processing in individual processing nodes, referred to as "bolts." The topology defines the input to a bolt as either a spout or another bolt. Thus, the topology defines connects between spouts and bolts. The output of one or more bolts forms the output of the topology.

In the illustrated embodiment, the stream processor (304) performs any or all of the processing operations described in the description of core pipeline (210) in FIG. 2. Details of these operations are not repeated herein. Importantly, the stream processor (304) ensures that a given event received over the data highway (204) is output at most once to the streaming queue(s) (306). Thus, during processing, the stream processor (304) detects and drops any duplicated events. FIG. 4 provides further detail regarding specific techniques for performing this detection and dropping.

As illustrated, the stream processor (304) outputs the processed and de-duplicated event stream to one or more streaming queues (306). In one embodiment, the streaming queues (306) comprise one or more Apache® Kafka queues. Since the event stream is processed by the stream processor (304), the data stored in the streaming queues (306) can be considered as source of truth for downstream consumers. Thus, a low-latency consumer system (206) can directly access the streaming queues (306). In this manner, the system (300) can simulate a fully streaming pipeline. As will be discussed, since the stream processor (304) processes the event stream and ensures that no records are dropped or duplicated, the simulated stream in the streaming queues (306) is more accurate than a raw event stream. Furthermore, as will be discussed, the output of the stream processor (304) includes the results of more complicated or advance operations (e.g., joins or dimensional annotation) which are not possible using traditional stream processing techniques.

A spooler (308) and auditor (310) use the output of the stream processor (304) to support advanced operations by the stream processor (304). FIG. 4 provides more detail regarding the spooler (308) and reference is made to that description.

In one embodiment, the spooler (308) comprises a second stream processor. The spooler (308) ensures that a one-to-one mapping between streamed data and data written to the fact feed (210) exists. The spooler (308) also ensures that streaming events retrieved from the queues (306) appears exactly once in the fact feed (210) (i.e., no events in the queues, 306, are duplicated). As such, the spooler (308) may comprise a separate stream topology similar to the stream processor (304). In contrast to the stream processor (304), the spooler (308) reads events from the streaming queues (306). Thus, the event stream to the spooler (308) comprises the processed events. As illustrated, prior to writing to the fact feed (210), the spooler (308) outputs to the auditor (310) via a buffer (312). In one embodiment, the output of the spooler (308) comprises a flat file (e.g., an HDFS file) and the buffer (312) comprises a distributed file system such as HDFS. In one embodiment, this flat file comprises a set of events occurring in a given batch period. Thus, the flat file simulates batch processing, but using the streaming events.

In the illustrated embodiment, an auditor (310) receives the output of the spooler (308). As described above, in some embodiments, the output of the spooler (308) comprises a batch file of events. In the illustrated embodiment, the auditor (310) also accesses raw event storage (302). In one embodiment, the format of the raw event storage (302) and the output of the spooler (308) are the same. For example, spooler (308) may write flat files to HDFS buffer (312) and raw event storage (302) may comprise raw events stored in the same type of file (e.g., HDFS). In the illustrated embodiment, the auditor (310) retrieves a batch file from buffer (312). In one embodiment, this batch file is associated with a fixed period. In some embodiments, this fixed period is represented in the filename or in metadata. Using this fixed period, the auditor (310) then retrieves a set of events from the raw event storage (302) matching the fixed period. In one embodiment, the periods of the buffer (312) and the raw event storage (302) are synchronized. In this embodiment, the auditor (310) then retrieves a single file from the raw event storage (302) that matches the period pulled from the buffer (312). In other embodiments, the auditor (310) may execute a MapReduce job to identify events split across multiple files. In this embodiment, the periods represented by files in the raw event storage are not synchronized with the buffer (312). Thus, the auditor (310) must patch together portions of multiple files stored in raw events storage (302) to rebuild a period of raw events matching the period stored in the buffer (312). In either event, the auditor (310) receives two files containing raw events from raw event storage (302) and a set of processed events for the same period stored in buffer (312).

In general, the auditor (310) ensures that each processed event in the buffer (312) matches a raw event stored in raw event storage (302). Thus, the auditor (310) ensures that no events were dropped during processing by the stream processor (304) and that no events were duplicated. If the auditor (310) detects that an event exists in the raw event storage (302) and does not exist in the corresponding buffer (312) output, the auditor (310) sends the missing event back to the stream processor (304) for re-processing.

The stream processor (304) reprocesses the events using the same processing logic used to process the event originally. In some embodiments, the stream processor (304) may add a field to the reprocessed event to indicate it was (or will be) reprocessed. In most embodiments, the stream processor (304) will properly process the event during re-processing. However, if the stream processor (304) cannot reprocess the event (as detected by the auditor, 310), the system (300) may gracefully handle the error. In one embodiment, the auditor (310) can itself add a field to the raw event indicating that the raw event was not processed and write the event along with the processed events.

After any missing events are re-processed, the auditor (310) writes the final output to the fact feed (210). Since spooler (308), buffer (312) and auditor (310) operate on batches of events, the fact feed (210) comprises a simulated batch data store. In some embodiments, the auditor (310) will delay writing to the fact feed (210) until any events are re-processed. In other embodiments, the auditor (310) writes the partially final output file to the fact feed (210) and updates the file upon completing the re-processing.

FIG. 4 is a block diagram illustrating a core pipeline according to some embodiments of the disclosure. Various elements of FIG. 4 are described in the previous figures and those elements are not described again herein.

In the illustrated embodiment, a stream processor (304) receives events from a data highway (204). In the illustrated embodiment, the stream processor (304) receives events from the data highway (204) via an initial spout (404). The stream processor (304) as illustrated includes two separate spouts (404, 422). In the illustrated embodiment, the stream processor (304) utilizes two spouts (404, 422) to distinguish between event streams (e.g., original versus re-processing). In the illustrated embodiment, the stream processor (304) topology can be configured to add additional extract-transform-load (ETL) steps (e.g., bolts) for the reprocessing spout (422) versus events received via the initial spout (404).

In the illustrated embodiment, the stream processor (304) processes events received via spouts (404, 422) via ETL logic (406). As described previously, ETL logic (406) may comprise a series of linear processing stages (e.g., bolts) for each operation performed on events.

In the illustrated embodiment, the ETL logic (406) outputs processed events to two streaming queues (408a, 408b). In one embodiment, the two queues (408a, 408b) store varying types of event data. As illustrated, a first queue (408a) is accessed by a partial stream consumer system (424). In the illustrated embodiment, the first queue (408a) may be filled by the ETL logic (406) prior to the execution of all processing steps. In the illustrated embodiment, the ETL logic (406) may eschew more complicated and time-consuming operations and interrupt the full processing steps to provide low latency operations. In some embodiments, this bypassing includes foregoing joins, traffic protection, annotation, etc. In the illustrated embodiment, the partial stream consumer system (424) may comprise a fast feedback system such as budget or pacing systems that are willing to accept a certain level of error. Thus, the first queue (408a) provides "best effort" data wherein the system (400) does not guarantee the accuracy of the data. In practice, however, the system (400) will generally process a large amount of data correctly enough that the best effort data in the first queue (408a) is of value to the partial stream consumer system (424).

In contrast to the first queue (408a), the stream processor (302) fills the second queue (408b) with the results of the full ETL processing. Thus, the ETL logic (406) fully processes the data in the second queue (408b), including performing joins, deduplication, annotations, fraud detection, traffic protection, etc. In one embodiment, the complete streaming consumer system (426) access second queue (408b) can retrieve data that achieves close to exactly once performance (that is, no events are dropped or duplicated) since the data was fully processed in the ETL logic (406). In some embodiments, this performance will meet "exactly once" performance. However, in other embodiments, the output of the second queue (408b) is still subject to inaccuracies caused by the underlying messaging queue. In some embodiments, a near exactly one completeness from second queue (408b) comprises a 99.9% guarantee of completeness. Such a confidence level is often suitable for applications such as real-time reporting.

Finally, as illustrated and discussed above, a final fact feed (210) meets exactly once requirements of all systems and provide batch-like performance. That is, data in the fact feed (210) will be fully de-duplicated and ensure that no events were dropped. As discussed in FIG. 3, this guarantee is implemented via spooler (308) and auditor (310). Auditor (310) is described more fully in FIG. 3 and those details are incorporated herein by reference.

In the illustrated embodiment, the spooler (308) is illustrated as including deduplication writer (412), deduplication store (414), and a fact feed writer (416).

In the illustrated embodiment, the deduplication writer (412) receives events from the second queue (408b). An event is uniquely identified by an event identifier (event id).

The spooler (308) considers two events as duplicates if they have the same event identifier. Events may include additional, but standardized, fields such as a type, timestamp, join status, and secondary event identifiers.

The deduplication writer (412) writes each of the events to deduplication store (414). In one embodiment, the store (414) comprises a database such as HBase or a similar storage device. Upon receiving an event, the writer (412) analyzes the fields associated with the event. If the event includes one or more secondary event identifiers, the writer (412) will retrieve all events stored in store (414) matching these secondary event identifiers and update the entries to indicate that a primary event is available (i.e., will be written to the store, 414). The writer (412) will then write the received event to the store (414) using the event identifier as a key. In some embodiments, a salt will be added to the event identifier before using the event identifier as a key. In the illustrated embodiment, the writer (412) will not write the event if the event has secondary event identifiers and the initial step of updating the secondary events is not successful. In some embodiments, the writer (412) will serialize the event prior to writing the event as a value for the event identifier key.

In the illustrated embodiment, the deduplication store (414) stores events per batch period and per type of event. In some embodiments, the store (414) creates a new table for each event type and batch period pair for a fixed period of time (e.g., one week) since the current time. The store (414) additionally includes a pruning process that periodically inspects the created tables and removes older tables not occurring within the current period (e.g., older than one week). In some embodiments, the auditor (310) initiates this pruning process upon confirming that all data for a given period is certified.

The spooler (308) additionally includes a fact feed writer (416). In the illustrated embodiment, the fact feed writer (416) waits for a signal from auditor (310) to trigger a spooling process to write the events in the store (414) to the fact feed (210) for a particular batch period and event type. In one embodiment, the fact feed writer (416) includes an internal web server that comprises a Hypertext Transfer Protocol (HTTP) endpoint that is called by the auditor (310) to initiate the spooling. As described above, once the auditor (310) confirms that the data in the store (414) is fully processed and certified, the auditor (310) issues a call to the endpoint which causes the writer (416) to start writing to the fact feed (210). In one embodiment, the writer (416) executes a distributed process routine to per from a full table scan of the store (414) and write the events to the fact feed (210).

For each event in the store (414), the writer (416) will deduplicate the events prior to writing. In one embodiment, the writer (416) will first determine if an event has one or more secondary identifiers and whether that secondary event was successfully joined to the event under inspection. If so, the writer (416) will select the most recent secondary event and write that joined event to the fact feed (210). Alternatively, if the event under inspection indicates that a primary event is available, the writer (416) will skip the event (since a root event exists). Finally, if the event does not have secondary identifiers and the primary event flag is not raised, the writer (416) will write out the event as failed since the secondary event was not properly joined.

In some embodiments, low-latency consumers may not want to or be able to consume a low-latency stream (408a) directly. For example, the stream might contain personally-identifiable fields that need to be restricted to specific consumers or the final consumer may need additional processing of events for their use. As another example, the consumer may be consuming from many sources and is unable to handle different event schemas of their various inputs. In these scenarios, the system (400) provides derived low-latency streams, or "filters", that have all of the events (or at least all of the desired events) as the second queue (408b) stream. Each filter can be associated with a quality of service (QoS) level. In the illustrated embodiment, three QoS levels are provided: "at least once", "at most once", and "at least once with tag."

A filter having an at least once QoS outputs every event but potentially includes duplicates. In the event of a system (400) failure, the at least once filter resends previously-sent events. A filter having an at most once QoS does not include duplicates but potentially drops data. The at most once filter does not reprocess the same event batch more than once.

Finally, a filter having an at least once with tag QoS generates batch dataset wherein each event in the batch includes tags allowing downstream consumer systems to detect duplicates. In one embodiment, this filter includes a stream topic, partition, and a "cursor," that can be used to detect duplicates. In some embodiments, Kafka offsets and CMS Message Ids could provide such cursors. The consumer system is then responsible for keeping track of the last cursor it processed, and discard any subsequent batch with a cursor less than or equal the new batch. This requires a 1-to-1 correspondence between batches in the pipeline and derived streams.

Each of the above filters may be implemented via a separate stream processor (e.g., stream topology). In these embodiments, the filters utilize an output of the system (400) (e.g., queues 408a, 408b) as an input source (e.g., spout) and output the filtered feed.

For the at least one filter, the filter will always back up in the event of a failure and resend any events that cannot be confirmed as being successfully delivered. This filter uses the initial spout (404) and streaming queue (408b) as inputs (e.g., filter spouts). In this embodiment, the consumer is configured to not report its current read offset. When sending data, the filter spout includes the current events cursor in a message identifier. The receiver (e.g., sink) would then acknowledge the received message only after successfully delivering the filtered output to the derived stream. In some embodiments, the receiver could also use the existing spooler logic to fail a tuple if it can't deliver it, and then continue to fail subsequent tuples until it receives a restarting indication from the spout. Upon receipt of an acknowledgement, the filter spout would commit that cursor back to the system (400). On receipt of a fail of a sent event, the filter spout would back up the received offset to a cursor at or before the last acknowledged event and restart sending.

For the at most once filter, the filter spout enables automatically committing offsets in a stream queue. By turning on auto-commitment, the filter spout only transmits a given event once and does not re-transmit events causing duplication.

For the at least once with tag filter, the at least one filter mechanism can be used. However, in this filter, tags will be added prior to transmission to the consumer. These tags include the cursor, as described above, but also a topic and partition if they aren't implied by the derived stream's partition.

In some embodiments, an exactly once filter may be implemented based on the at least once with tag filter. In this embodiment, a receipt acknowledgement message can be saved as reliably as the system (400) can support. Additionally, the filter, on receipt of the acknowledgement, could update some persistent record of the delivered cursor. However, persisting this data may be computationally expensive and require significant storage. In an alternative embodiment, given the at least once with tag filter, the filter, on a start-up or after a failure, can access the output stream and read back a plurality of last-sent messages in the queue. The filter could then determine the tag of the last message written, then discard any replayed events from the spout until it was caught up, thus ensuring exactly once delivery.

As described above, many pipelines need to join independently generated events to produce a useful result. For example, an ad click event might be very lean, with only minimal information about what was clicked. To get maximum benefit from the click, it must be joined to a previous ad serve (or impression) event that has extensive information about what was clicked, such as the ad served, who it was served to, and why the ad was picked for this particular ad request.

In batch pipelines, such joins are performed after the close of books (COB) for a batch interval. However, as discussed, this results in join operations being performed significantly after the events to join were received. Current stream processing techniques suffer from various deficiencies in performing joins. In brief, current systems attempt to "simulate" a join by windowing events. However, if events are sufficiently spaced (i.e., outside the join window), joins are not possible. To maximize speed (i.e., the reason for using a stream processor), the join window is generally kept small (in seconds) and thus long periods between events render the joins impossible. Further, in a stream processor, the order of delivery of events isn't guaranteed, and components can't keep a long history of events waiting to be joined.

To remedy these problems, the embodiments provide a pluggable join framework that may be used in the previously describe systems or other streaming processing systems.

Figure 5:
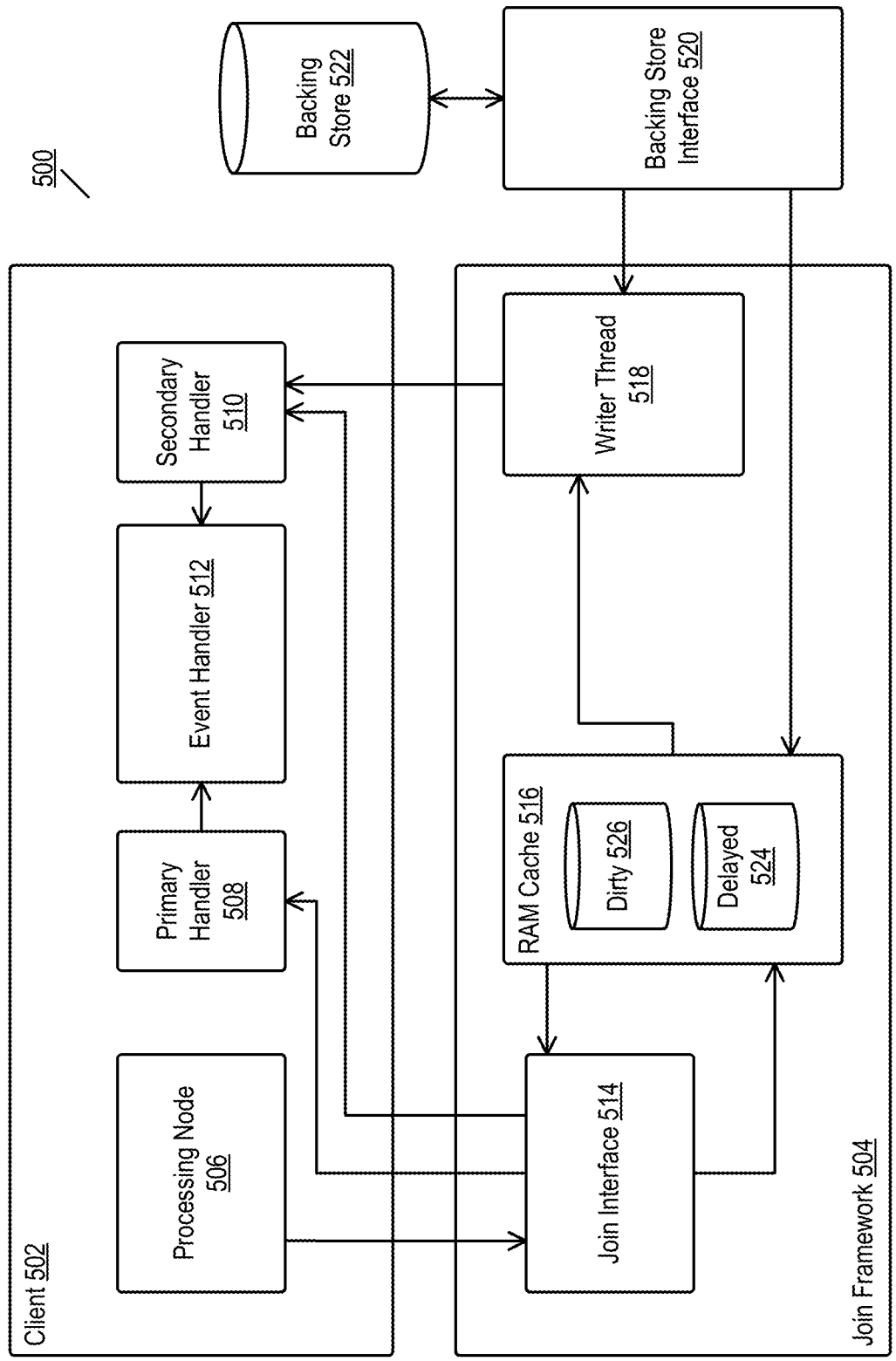
FIG. 5 is a block diagram illustrating a pluggable join framework for stream processors according to some embodiments of the disclosure.

FIG. 5 is a block diagram illustrating a pluggable join framework for stream processors according to some embodiments of the disclosure.

As discussed, the streaming system (200) described above guarantees reliable delivery of events from a low-latency stream processor (304). While providing low-latency outputs, the pipeline (210) has logic to detect lost events and replay them, but also detect and eliminate duplicated events. The results of the pipeline (210) is as reliable as current batch data processing pipelines. To meet these demands, the system (200) imposes some additional requirements on joins to support reliable delivery, primary the ability to resend a secondary event on receipt of the matching primary when the primary is received long after the secondary. The system (500) illustrated in FIG. 5 provides a join framework plugin that implements the join logic of the pipeline (210), but is agnostic of the details of the events to be joined. In the illustrated embodiment, the system (500) provides a pair of interfaces to handle any event format and a stream processor can use the join framework plugin to implement a join.

In the illustrated embodiment, a client (502) communicates with a join framework (504). In the illustrated embodiment, the client (502) comprises a stream processor (or component of a stream processor) that receives events and performs join operations on events. In the illustrated embodiment, the join framework (504) comprises a pluggable join framework that may be "added on" to the client device. The join framework (504) receives events from the client (502) and processes join operations. The join framework (504) communicates with a backing store (522) via a backing store interface (520). In some embodiments, the backing store (522) may comprise a distributed database (e.g., Apache® HBase) although other types of data storage systems may be used (e.g., MySQL, Redis, etc.). In the illustrated embodiment, interface (520) provides an abstraction layer such that the join framework (504) need not issue commands specific to the backing store (522). The interface (520) handles transferring rows to and from backing store (522). For example, in some embodiments, the interface (520) supports a fetch row and put row command and handles the underlying conversion to commands recognizable by the backing store (522).

In the illustrated embodiment, the client (502) includes a processing node (506), a parent event handler (512) and primary (508) and secondary (510) event interfaces. In one embodiment, the processing node (506) comprises a processing node in a stream topology and may connected to one or more other processing nodes as described above. Processing node (506) may also be referred to as a join node.

In the illustrated embodiment, the interfaces (508, 510, 512) provide callback functions used by the join framework (504) to deal with specifics of the stream topology events. There are separate interfaces for handling primary (508) and secondary (510) events, with a common parent interface (512) that applies to both. The parent interface (512) defines methods that are used for both primary and secondary events. In one embodiment, the parent interface (512) may implement the following methods:

columnName( )—Return the name of the backing store (522) column that will store this type of event.

getKey(event)—Return the join key for an event. In some embodiments, the client (502) determines the algorithm for constructing this key. In one embodiment, the algorithm is selected to prevent "hot spotting" in the backing store (522).

primaryTime(event)—Return the time of the primary event. In some embodiments, this time is part of the main key. In the illustrated embodiment, this time may be used to reduce unnecessary get operations issued to the backing store (522) the first time a given key value is seen.

serialize(event)—Serialize an event into a byte array for storage in backing store (522).

deserialize(serializedEvent)—Deserialize the event that's been retrieved from backing store (522).

failEvent(tag), ackEvent(tag)—If desired, fail or acknowledge an event received by processing node (506). In some embodiments, these functions are called once the framework (504) is completely done processing an event.

deliverEvent(tag, event)—Send an event. The tag parameter identifies the incoming event. In some embodiments, the client (502) uses the tag for anchoring on emit.

In the illustrated embodiment, the primary handler (508) inherits from the parent handler (512) and implements the following event:

markJoined(primary, secondary, secondaryType): —Mark a primary event as already joined to a secondary event. In some embodiments, this is used in the out-of-order case (discussed in FIGS. 6B and 6C) when the primary event arrives after the secondary event has already been sent unjoined.

In the illustrated embodiment, the secondary handler (508) inherits from the parent handler (512) and implements the following events:

joinEvent(primary, secondary, late)—Join the primary event and secondary event and return an annotated secondary event. The late parameter is true if this the join comprises a late join.

markUnjoined(secondary)—Mark this event as unjoined. In some embodiments, this method is called by the framework (504) when a primary event can't be found for a secondary event.

In the illustrated embodiment, the join interface (514) and writer thread (518) access the primary and secondary interfaces (508, 510) and issue the above calls during processing of events. Details of these calls are provided in further detail in FIGS. 6A, 6B, and 6C.

In the illustrated embodiment, the join interface (514) implements the following methods:

prepare(context, primaryId, handlerMap)—called to let the interface (514) initialize itself when the processing node (506) starts running in a worker thread. In the illustrated embodiment, the primaryId parameter is the identifier (a client-defined enumerated type) for the primary event type. In the illustrated embodiment, the handlerMap parameter comprises a map from event type to event hander.

processPrimary(tag, event)—Process a received primary event. In one embodiment, the tag is an event tag that will be used in a subsequent ackEvent( ), failEvent( ) or deliverEvent( ) call.

processSecondary(tag, event, type)—Process a secondary event. In one embodiment, the tag is an event tag that will be used in a subsequent ackEvent( ), failEvent( ) or deliverEvent( ) call. In the illustrated embodiment, the type parameter is a parameter initialized in the call to prepare( ).

In the illustrated embodiment, the join framework (504) includes a RAM cache (516). In one embodiment, the cache (516) comprises a local in-memory cache accessible only within the join framework (504). In one embodiment, the cache (516) comprises one or more key-value stores or similar low-latency caches. In one embodiment, the cache (516) stores events as value and join keys as keys. As illustrated, the cache (516) may include two logical (and/or physical) caches including dirty cache (526) and delayed cache (524). In one embodiment, the dirty cache (526) stores data to eventually persist to backing store (522). In one embodiment, the cache (526) comprises a "high watermark" cache. In this embodiment, the cache (526) knows that any join key created after time T is still in the cache (526) if that key has been seen at all. In one embodiment, T is updated as necessary when the cache (526) is purged. In this embodiment, the purging usually eliminates the need for a backing store (522) fetch the first time a key is seen. In one embodiment, the delayed cache (524) comprises a cache for temporarily storing events while awaiting a next event. Both caches are described in more detail herein.

In the illustrated embodiment, a writer thread (518) is responsible for reading data from the RAM cache (516) and writing data to the backing store (522) as required. In the illustrated embodiment, the writer thread (518) may also delivery events to the client (502) via the primary and secondary event interfaces (508, 510).

Figure 6A:
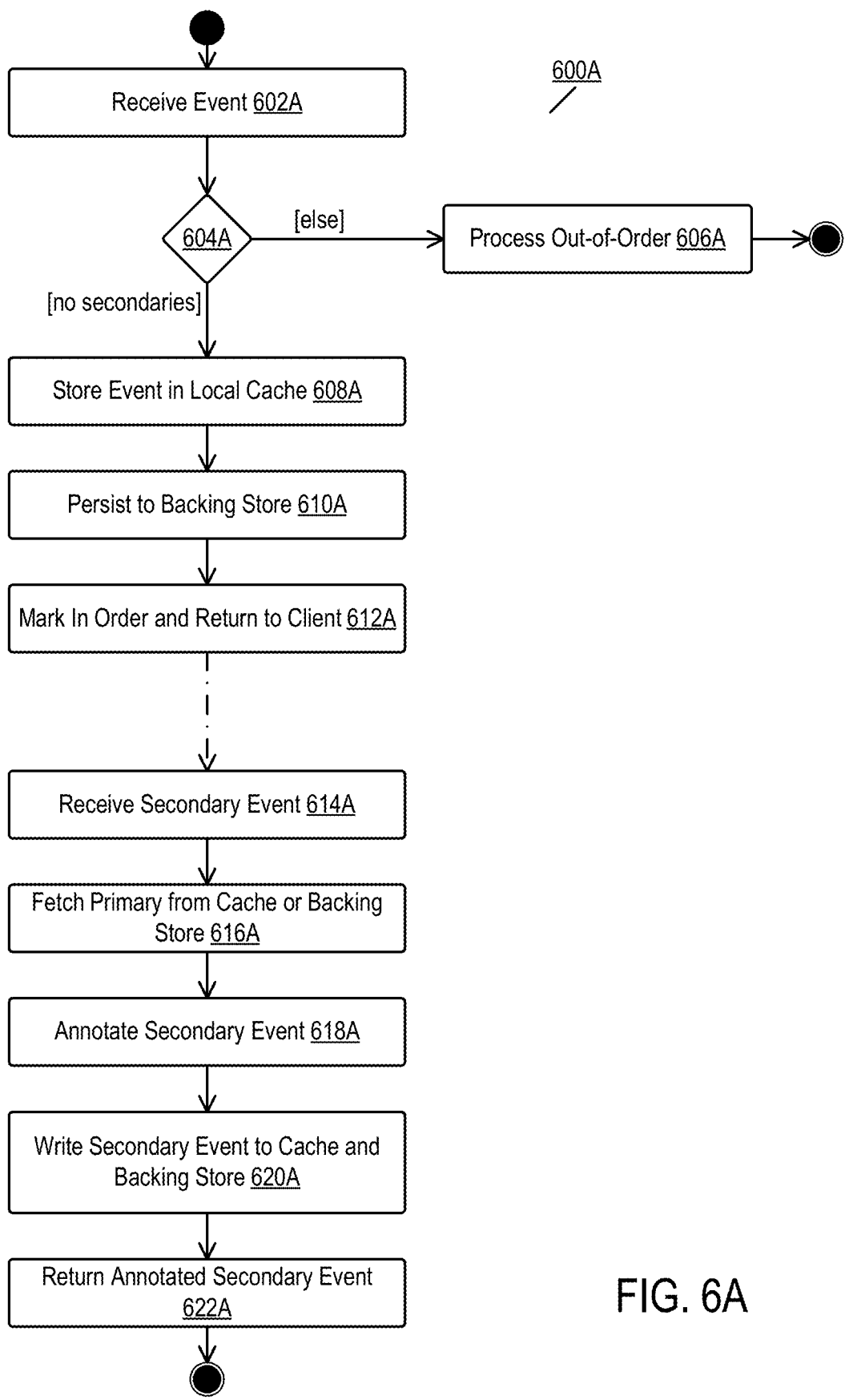
FIG. 6A is a flow diagram illustrating a method for performing an in-order join using a pluggable join framework according to some embodiments of the disclosure.

FIG. 6A is a flow diagram illustrating a method for performing an in-order join using a pluggable join framework according to some embodiments of the disclosure.

In step 602a, the method (600a) receives an event. As discussed, an event comprises either a primary or secondary event. In general, a primary event comprises a base event and secondary events comprise events to be joined to the base event. An example of a primary event is a serve or impression event with details regarding the display of an advertising creative and a corresponding example of a secondary event comprises a click or touch event that refers to a serve or impression event and includes minimal data regarding the actual event (e.g., a timestamp). In this example, the joined event could include all fields of a serve event and all fields of a corresponding click event, although the specific fields are not limiting. As discussed above, the method (600a) receives an event via a stream processor. In one embodiment, the method (600a) receives events via the processPrimary method call implemented by the join interface (514) and called by the client (502).

In step 604a, the method (600a) determines if one or more secondary events are present. In some embodiments, the method (600a) may query a cache to determine if one or more secondary events were already received and stored. If secondaries have already been received, the method (600a) can join the events as out-of-order events (step 606a) and emit the joined event without further processing. Processing of out-of-order events is described more fully in FIGS. 6B and 6C. In some embodiments, the join interface (514) will issue a getKey command to the primary interface (508) which returns the join key of the primary event. The join interface (514) will then issue a fetch command to the RAM cache (516) to determine if any secondary events with the same join key exist in the RAM cache (516). In some embodiments, the RAM cache (516) may issue a fetch command to the backing store interface (520) to retrieve the event from the backing store (522).

In step 608a, if no secondary events were found in step 604a, the method (600a) stores the event in the local cache. In one embodiment, the join interface (514) will insert the primary event into the RAM cache (516) as part of step 608a.

In step 610a, the method (600a) awaits confirmation that the primary event was stored in the local cache and then persists the event to the backing store. In one embodiment, the join interface (514) issues a queue command to the RAM cache (516) that triggers the write. Once the RAM cache (516) detects that step 608a was completed, the RAM cache (516) issues a write command to the writer thread (518), the write command including the primary event. The writer thread (518) then issues a put command to the backing store interface (520) to write the primary event to the backing store (522).

In step 612a, the method (600a) marks the primary event as in-order and returns the event to the client (502). In one embodiment, since no secondary events were found, the method (600a) determines that the primary event was received before any secondary events and thus the event was received in-order. In one embodiment, the method (600a) awaits confirmation that the primary event was written to the backing store (522) prior to returning the event to the client (502). In one embodiment, the writer thread (518) delivers the event to the client (502) upon the completed write to the backing store (522). In one embodiment, the writer thread (518) calls the deliverEvent and ackEvent methods on the primary event handler (508) to deliver the marked event.

In the illustrated embodiment, at a later time, a client (502) receives a secondary event to be joined with the primary event. In the illustrated embodiment, in step 614a, the method (600a) receives this later secondary event from the client. In one embodiment, the client (502) calls a processSecondary command on the join interface (514) to transmit this event to the method (600a).

In step 616a, the method (600a) fetches the associated primary event from the local cache or backing store, the associated primary event sharing a join key with the secondary event received in step 614a. In one embodiment, the join interface (514) issues a get command to the RAM cache (516) using the join key present in the received secondary event. In some embodiments, if the RAM cache (516) includes a value for the join key, the RAM cache (516) returns the event. In some embodiments, if the RAM cache (516) does not have a value for the join key, the RAM cache (516) fetches the event from the backing store (522). It should be noted that in FIG. 6B, the method (600b) determines whether a secondary event comprises an in-order or out-of-order event. Thus, in the illustrated embodiment, the method (600a) will always return a primary event in step 616a barring a catastrophic failure.

In step 618a, the method (600a) annotates the secondary event. In one embodiment, the join interface (514) issues a deserialize command to the primary event handler (508). The join interface (514) then transmits the deserialized primary event and the secondary event to the secondary event handler (510) via a call to the joinEvent method. In this embodiment, the join interface (514) will set the late parameter to false. In one embodiment, the join interface (514) will then issue a call to the serialize method of the secondary event handler (510) to obtain a serialized version of the joined secondary event.

In step 620a, the method (600a) writes the serialized event to the backing store. In one embodiment, the join interface (514) inserts the serialized secondary event into the RAM cache (516) and instructs the RAM cache (516) to update the backing store (522) upon completing writing to the dirty cache (526). Once the RAM cache (516) completes inserting the secondary event to the dirty cache (526), the cache (516) transmits the serialized secondary event to the writer thread (518) for writing to the backing store (522). The writer thread (518) issues the serialized event to the backing store (520) interface which writes the event to the backing store (522) which will then acknowledge confirmation of the write.

In step 622a, the method (600a) returns the annotated secondary event to the client (502). In one embodiment, the method (600a) marks the secondary event as "in-order." In the illustrated embodiment, the method (600a) delays step 622a until receiving confirmation that the event was written to the backing store (522). In one embodiment, the writer thread (518) calls the deliverEvent and ackEvent methods on the secondary event handler (510) to deliver the joined secondary event.

In the illustrated embodiment of method (600a), there may be scenarios were the secondary event arrives before the primary event has been committed to the backing store in step 610a. In this scenario, the primary and secondary events will be committed to the backingstore an sent to the client at the same time.

As discussed previously, primary events are always logically created before secondary events. However, there is a possibility that that the primary event may be received by the client (502) after its related secondary events. In some embodiments, this is caused by the data transport delivering events. The following methods describe techniques for handling out-of-order join events.

Figure 6B:
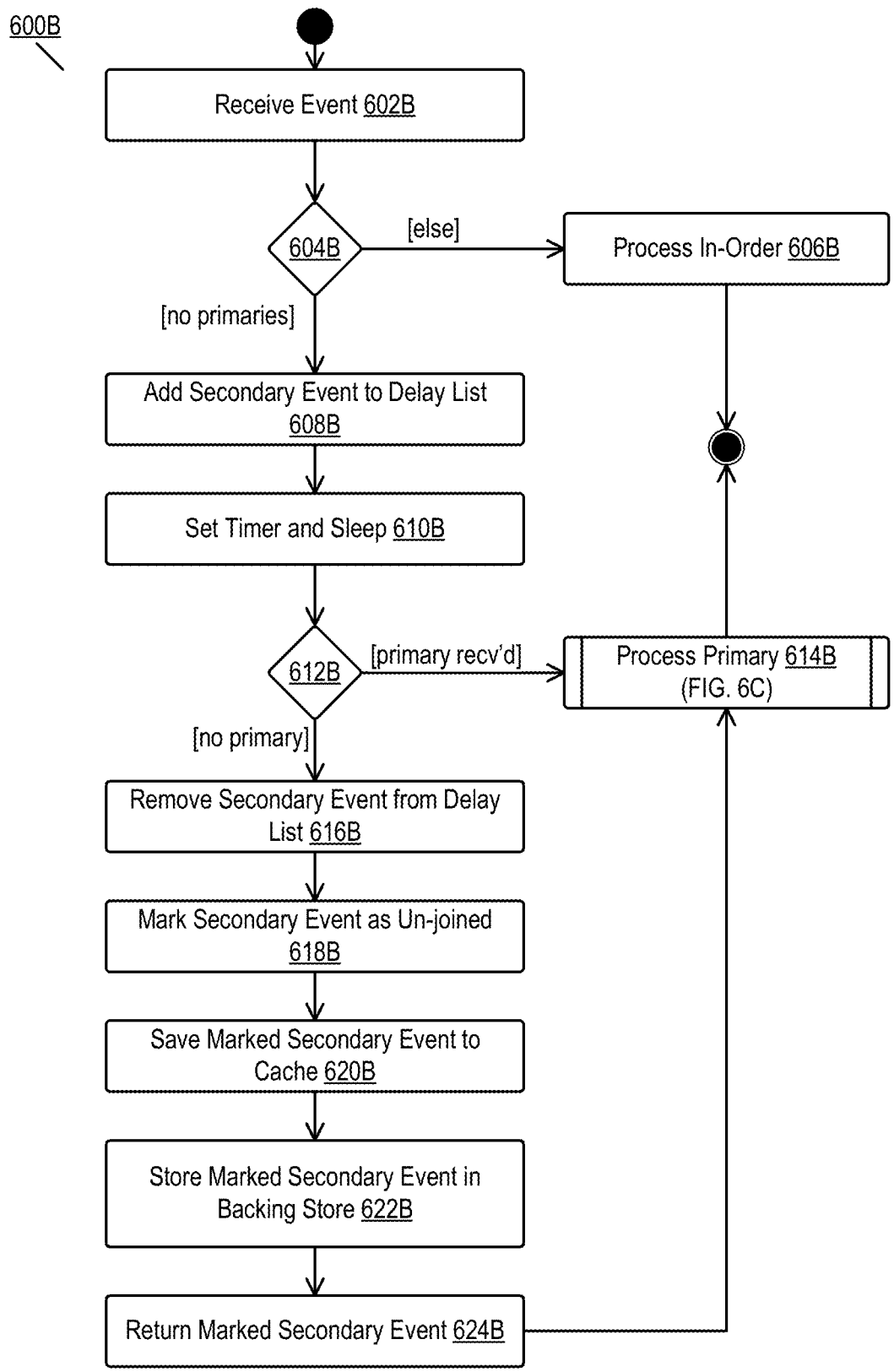
FIGS. 6B and 6C are flow diagrams illustrating a method for performing an out-of-order join using a pluggable join framework according to some embodiments of the disclosure.
Figure 6C:
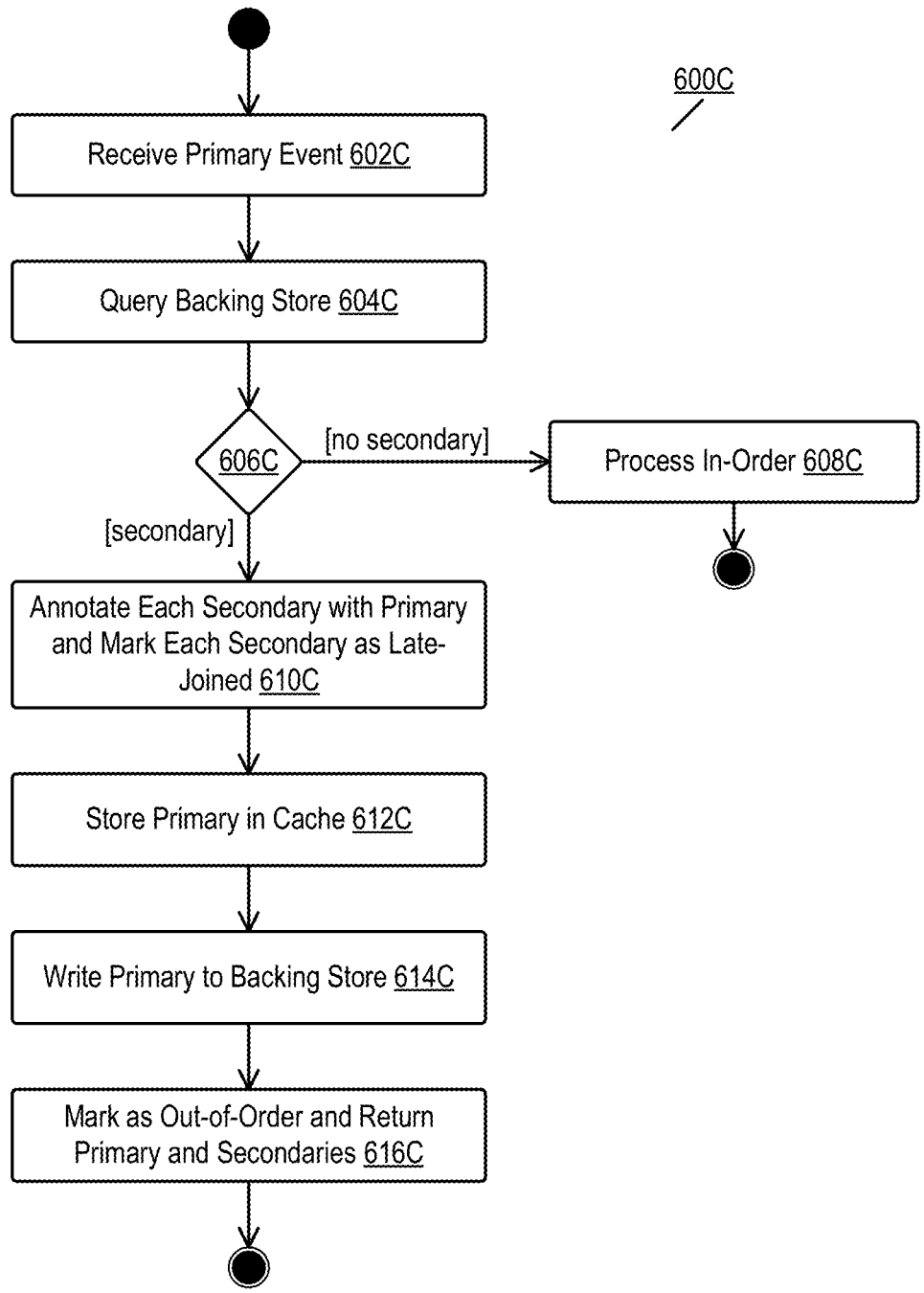

FIGS. 6B and 6C are flow diagrams illustrating a method for performing an out-of-order join using a pluggable join framework according to some embodiments of the disclosure.

In step 602b, the method (600b) receives an event. As discussed, an event comprises either a primary or secondary event. In general, a primary event comprises a base event and secondary events comprise events to be joined to the base event. An example of a primary event is a serve or impression event with details regarding the display of an advertising creative and a corresponding example of a secondary event comprises a click or touch event that refers to a serve or impression event and includes minimal data regarding the actual event (e.g., a timestamp). In this example, the joined event could include all fields of a serve event and all fields of a corresponding click event, although the specific fields are not limiting. As discussed above, the method (600b) receives an event via a stream processor. In one embodiment, the method (600b) receives events via the processSecondary method call implemented by the join interface (514) and called by the client (502).

In step 604b, the method (600b) attempts to fetch one or more primary events. In one embodiment, the join interface (514) queries the RAM cache (516) using the join key of the secondary event to determine if any primary events are stored in the dirty cache (526). If no events are stored in the dirty cache (526), the RAM cache (516) may issue a fetch command to the backing store interface (520) to retrieve any primary events stored in the backing store (522).

In step 606b, the method (600b) processes the secondary event received in step 602b as an in-order secondary event upon receiving a primary event from the RAM cache (516) or backing store (522). This step is described more fully in FIG. 6A.

In step 608b, the method (600b) adds the secondary event to a delayed queue (524) upon determining that no primary events have been cached or persisted. In one embodiment, the join interface (512) writes the secondary event to the delay cache (524) of the RAM cache (526) as part of step 608b.

In step 610b, the method (600b) sets timer and sleeps. In one embodiment, the sleep timer may be configured based on the needs of the join framework (504).

In step 612b, the method (600b) determines if a corresponding primary event was received while the sleep timer is active.

In step 614b, the method (600b) processes the incoming primary event if the sleep timer did not expire. Details of this processing are described in FIG. 6C. It should be noted that the implementation of steps 608b, 610b, and 612b may be optional. In general, these steps compensate for minimally delayed primaries and short circuit writes to the cache or backing store if an out-of-order primary event is received quickly after a secondary event. Thus, steps 616b through 624b may only then execute for significantly delayed primary events.

In step 616b, the method (600b) removes the secondary event from the delay queue (524) if the sleep timer expires and no corresponding primary events were received. In some embodiments, this step may be performed by a dedicated delay handler executing in the join framework (504). In one embodiment, this handle removes the event from the delay queue (524) and calls the processSecondary method again to re-process the event. In this scenario, the method (600b) will be executed anew, but may proceed directly to step 618b.

In step 618b, the method (600b) marks the secondary event as unjoined. In the illustrated embodiment, the join interface (512) calls the markUnjoined method of the secondary event handler (510) and passes the secondary event to the handler (510). The interface (512) may then call the serialize method on the secondary event handler (510) to receive the serialized event.

In step 620b, the method (600b) saves the marked secondary event to the local cache. In one embodiment, the join interface (514) will insert the secondary event into the dirty cache (526) of the RAM cache (516) as part of step 620b.

In step 622b, the method (600b) awaits confirmation that the secondary event was stored in the local cache and then persists the event to the backing store. In one embodiment, the join interface (514) issues a queue command to the RAM cache (516) that triggers the write. Once the RAM cache (516) detects that step 620b was completed, the RAM cache (516) issues a write command to the writer thread (518), the write command including the secondary event. The writer thread (518) then issues a put command to the backing store interface (520) to write the secondary event to the backing store (522).

In step 624b, the method (600b) returns the marked secondary event. In one embodiment, the writer thread (518) delivers the event to the client (502) upon the completed write to the backing store (522). In one embodiment, the writer thread (518) calls the deliverEvent and ackEvent methods on the secondary event handler (510) to deliver the marked event.

As discussed above, FIG. 6C is a flow diagram illustrating a method for processing an out-of-order primary event according to some embodiments of the disclosure.

In step 602c, the method (600c) receives a primary event. In one embodiment, the method (600c) receives events via the processPrimary method call implemented by the join interface (514) and called by the client (502) passing the primary event.

In step 604c, the method (600c) queries the backing store using join key of the primary event. In some embodiments, the join interface (514) will issue a getKey command to the primary interface (508) which returns the join key of the primary event. The join interface (514) will then issue a fetch command to the RAM cache (516) to determine if any secondary events with the same join key exist in the RAM cache (516). In some embodiments, the RAM cache (516) may issue a fetch command to the backing store interface (520) to retrieve the event from the backing store (522).

In step 606c, the method (600c) determines if any secondary events were returned from the query.

In step 608c, the method (600c) processes the primary event as an in-order primary if no secondary events are found. In the illustrated embodiment, this processing is performed as described in FIG. 6A.

In step 610c, the method (600c) annotates each secondary event with fields from the primary event and marks each secondary event as late-joined if one or more secondary events were returned from the query in step 606c. In one embodiment, the method (600c) additionally marks each of the primary and secondary events as a "late join." In one embodiment, the join interface (514) issues a markJoined command to the primary event handler (508). The join interface (514) additionally issues a deserialize command to the secondary event handler (510) for each identified secondary event. The join interface (514) then transmits the deserialized primary event and the secondary event to the secondary event handler (510) via a call to the joinEvent method. In this embodiment, the join interface (514) will set the late parameter to true.

In step 612c, the method (600c) stores the primary event in the local cache. In one embodiment, the join interface (514) will insert the primary event into the dirty cache (526) of the RAM cache (516) as part of step 612c.

In step 614c, the method (600c) awaits confirmation that the primary event was stored in the local cache and then persists the event to the backing store. In one embodiment, the join interface (514) issues a queue command to the RAM cache (516) that triggers the write. Once the RAM cache (516) detects that step 614c was completed, the RAM cache (516) issues a write command to the writer thread (518), the write command including the primary event. The writer thread (518) then issues a put command to the backing store interface (520) to write the primary event to the backing store (522).

In step 616c, the method (600c) marks all events as out-of-order and returns each event to the client. In one embodiment, the writer thread (518) delivers the events to the client (502) upon the completed write to the backing store (522). In one embodiment, the writer thread (518) calls the deliverEvent and ackEvent methods on the primary and secondary event handlers (508, 510) to deliver the marked events.

Figure 7:
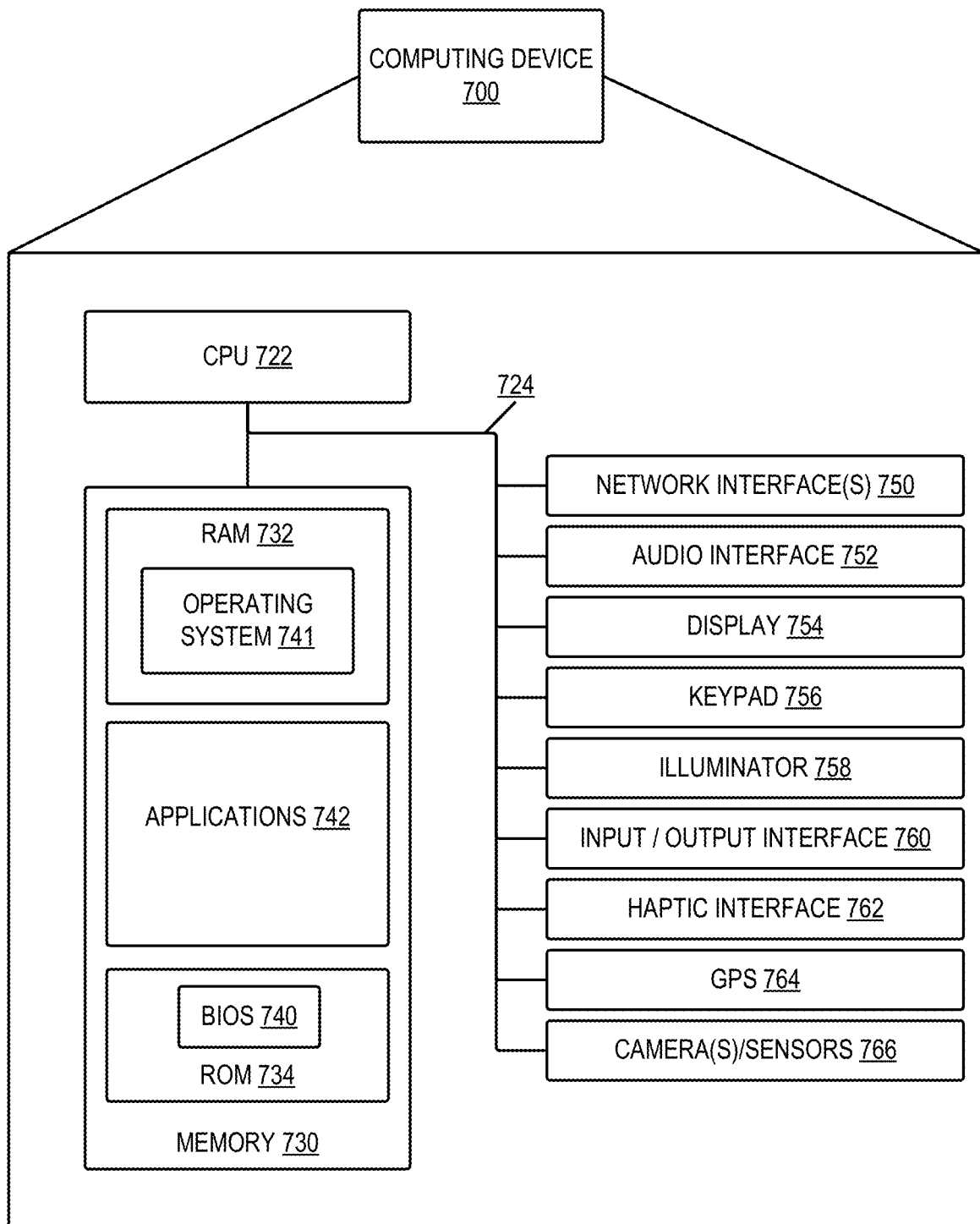
FIG. 7 is a schematic diagram illustrating a computing device showing an example embodiment of a client or server device used in the various embodiments of the disclosure.

FIG. 7 is a schematic diagram illustrating a computing device showing an example embodiment of a client or server device used in the various embodiments of the disclosure.

The computing device (700) may include more or fewer components than those shown in FIG. 7. For example, a server computing device may not include audio interfaces, displays, keypads, illuminators, haptic interfaces, GPS receivers, cameras, or sensors.

As shown in the figure, the device (700) includes a processing unit (CPU) (722) in communication with a mass memory (730) via a bus (724). The computing device (700) also includes one or more network interfaces (750), an audio interface (752), a display (754), a keypad (756), an illuminator (758), an input/output interface (760), a haptic interface (762), an optional global positioning systems (GPS) receiver (764) and a camera(s) or other optical, thermal, or electromagnetic sensors (766). Device (700) can include one camera/sensor (766), or a plurality of cameras/sensors (766), as understood by those of skill in the art. The positioning of the camera(s)/sensor(s) (766) on the device (700) can change per device (700) model, per device (700) capabilities, and the like, or some combination thereof.

The computing device (700) may optionally communicate with a base station (not shown), or directly with another computing device. Network interface (750) is sometimes known as a transceiver, transceiving device, or network interface card (NIC).

The audio interface (752) produces and receives audio signals such as the sound of a human voice. For example, the audio interface (752) may be coupled to a speaker and microphone (not shown) to enable telecommunication with others or generate an audio acknowledgment for some action. Display (754) may be a liquid crystal display (LCD), gas plasma, light-emitting diode (LED), or any other type of display used with a computing device. Display (754) may also include a touch-sensitive screen arranged to receive input from an object such as a stylus or a digit from a human hand.

Keypad (756) may comprise any input device arranged to receive input from a user. Illuminator (758) may provide a status indication or provide light.

The computing device (700) also comprises input/output interface (760) for communicating with external devices, using communication technologies, such as USB, infrared, Bluetooth™, or the like. The haptic interface (762) provides tactile feedback to a user of the client device.

Optional GPS transceiver (764) can determine the physical coordinates of the computing device (700) on the surface of the Earth, which typically outputs a location as latitude and longitude values. GPS transceiver (764) can also employ other geo-positioning mechanisms, including, but not limited to, triangulation, assisted GPS (AGPS), E-OTD, CI, SAI, ETA, BSS, or the like, to further determine the physical location of the computing device (700) on the surface of the Earth. In one embodiment, however, the computing device (700) may through other components, provide other information that may be employed to determine a physical location of the device, including, for example, a MAC address, Internet Protocol (IP) address, or the like.

Mass memory (730) includes a RAM (732), a ROM (734), and other storage means. Mass memory (730) illustrates another example of computer storage media for storage of information such as computer-readable instructions, data structures, program modules, or other data. Mass memory (730) stores a basic input/output system ("BIOS") (740) for controlling the low-level operation of the computing device (700). The mass memory also stores an operating system (741) for controlling the operation of the computing device (700)

Applications (742) may include computer-executable instructions which, when executed by the computing device (700), perform any of the methods (or portions of the methods) described previously in the description of the preceding Figures. In some embodiments, the software or programs implementing the method embodiments can be read from hard disk drive (not illustrated) and temporarily stored in RAM (732) by CPU (722). CPU (722) may then read the software or data from RAM (732), process them, and store them to RAM (732) again.

For this disclosure, a module is a software, hardware, or firmware (or combination thereof) system, process or functionality, or component thereof. A module performs or facilitates the processes, features, or functions described herein (with or without human interaction or augmentation). A module can include sub-modules. Software components of a module may be stored on a computer-readable medium for execution by a processor. Modules may be integral to one or more servers or be loaded and executed by one or more servers.

The terms "user," "subscriber," "consumer" or "customer" refer to a user of an application or applications as described herein or a consumer of data supplied by a data provider. By way of example, and not limitation, the term "user" or "subscriber" can refer to a person who receives data provided by the data or service provider over the Internet in a browser session, or can refer to an automated software application which receives the data and stores or processes the data.

One of skill in the art may implement the methods and systems of the present disclosure in many manners. As such, the disclosed embodiments are not to be limited by the preceding exemplary embodiments and examples. In other words, functional elements being performed by single or multiple components, in various combinations of hardware and software or firmware, and individual functions, may be distributed among software applications at either the client level or server level or both. In this regard, one may combine any number of the features of the different embodiments described herein into single or multiple embodiments, and alternate embodiments having fewer than or more than, all the features described herein are possible.

Functionality may also be, in whole or in part, distributed among multiple components, in manners now known or to become known. Thus, myriad software/hardware/firmware combinations are possible in achieving the functions, features, interfaces, and preferences described herein. Moreover, the scope of the present disclosure covers conventionally known manners for carrying out the described features and functions and interfaces. The scope of the present disclosure may also cover variations and modifications made to the hardware or software or firmware components described herein as would be understood by those skilled in the art.

Furthermore, the embodiments of methods presented and described as flowcharts in this disclosure are provided by way of example to provide a complete understanding of the technology. The disclosed methods are not limited to the operations and logical flow presented herein. Alternative embodiments exist that alter the order of the various operations or include independent sub-operations that are part of a more extensive operation.

While the disclosure describes various embodiments, such embodiments should not limit the teaching of this disclosure to those embodiments. Various changes and modifications may be made to the elements and operations described above to obtain a result that remains within the scope of the systems and processes described in this disclosure.

What is claimed is:

1. A method comprising:
   receiving a streaming event from a client;
   annotating the streaming event based on a primary streaming event received prior to the streaming event and returning the annotated streaming event to the client;
   determining that the streaming event comprises a secondary event and that the primary streaming event was not written to a cache;
   marking the streaming event as un-joined;
   writing the streaming event to the cache; and
   returning the marked streaming event to the client.

2. The method of claim 1, further comprising writing the primary streaming event to the cache and returning the primary streaming event to the client.

3. The method of claim 2, further comprising writing the primary streaming event to a backing store after the writing the primary streaming event to the cache.

4. The method of claim 2, further comprising marking the primary streaming event as in-order and returning the primary streaming event to the client before receiving the streaming event.

5. The method of claim 2, the further comprising determining the primary streaming event comprises a primary event by querying the cache for one or more secondary events.

6. The method of claim 2, further comprising:
   retrieving the streaming event from the cache;
   annotating the streaming event using the primary streaming event;
   marking the primary streaming event and the streaming event as out-of-order; and
   returning the primary streaming event and streaming event to the client.

7. The method of claim 1, further comprising writing the streaming event to a delay cache and sleeping until receiving a corresponding primary event.

8. A non-transitory computer-readable storage medium for tangibly storing computer program instructions capable of being executed by a computer processor, the computer program instructions defining steps of:
   receiving a streaming event from a client;
   annotating the streaming event based on a primary streaming event received prior to the streaming event and returning the annotated streaming event to the client;
   determining that the streaming event comprises a secondary event and that the primary streaming event was not written to a cache;
   marking the streaming event as un-joined;
   writing the streaming event to the cache; and
   returning the marked streaming event to the client.

9. The non-transitory computer-readable storage medium of claim 8, the steps further comprising writing the primary streaming event to the cache and returning the primary streaming event to the client.

10. The non-transitory computer-readable storage medium of claim 9, further comprising writing the primary streaming event to a backing store after the writing the primary streaming event to the cache.

11. The non-transitory computer-readable storage medium of claim 9, further comprising marking the primary streaming event as in-order and returning the primary streaming event to the client before receiving the streaming event.

12. The non-transitory computer-readable storage medium of claim 9, the steps further comprising determining the primary streaming event comprises a primary event comprising querying the cache for one or more secondary events.

13. The non-transitory computer-readable storage medium of claim 9, the steps further comprising:
    retrieving the streaming event from the cache;
    annotating the streaming event using the primary streaming event;
    marking the primary streaming event and the streaming event as out-of-order; and
    returning the primary streaming event and streaming event to the client.

14. The non-transitory computer-readable storage medium of claim 8, the steps further comprising writing the streaming event to a delay cache and sleeping until receiving a corresponding primary event.

15. An apparatus comprising a processor configured to:
    receive a streaming event from a client;
    annotating the streaming event based on a primary streaming event received prior to the streaming event and returning the annotated streaming event to the client;
    determine that the streaming event comprises a secondary event and that the primary streaming event was not written to a cache;
    mark the streaming event as un-joined;
    write the streaming event to the cache; and
    return the marked streaming event to the client.

16. The apparatus of claim 15, the processor further configured to write the primary streaming event to the cache and returning the primary streaming event to the client.

17. The apparatus of claim 16, the processor further configured to write the primary streaming event to a backing store after the writing the primary streaming event to the cache.

18. The apparatus of claim 16, the processor further configured to mark the primary streaming event as in-order and return the primary streaming event to the client before receiving the streaming event.

19. The apparatus of claim 16, the processor further configured to determine the primary streaming event comprises a primary event by querying the cache for one or more secondary events.

20. The apparatus of claim 15, the processor further configured to write the streaming event to a delay cache and sleeping until receiving a corresponding primary event.

* * * * *